US012676105B1

(12) United States Patent
Zhai et al.

(10) Patent No.: US 12,676,105 B1
(45) Date of Patent: Jul. 7, 2026

(54) DISPLAY PANEL AND DISPLAY DEVICE

(71) Applicant: Tianma Advanced Display Technology Institute (Xiamen) Co., Ltd., Xiamen (CN)

(72) Inventors: Yingteng Zhai, Xiamen (CN); Zhenyu Jia, Xiamen (CN); Feng Qin, Xiamen (CN)

(73) Assignee: Tianma Advanced Display Technology Institute (Xiamen) Co., Ltd., Xiamen (CN)

( * ) Notice: Subject to any disclaimer, the term of this patent is extended or adjusted under 35 U.S.C. 154(b) by 0 days.

(21) Appl. No.: 19/206,784

(22) Filed: May 13, 2025

(30) Foreign Application Priority Data

Feb. 26, 2025 (CN) ......................... 202510217339.5

(51) Int. Cl.
*G09G 3/32* (2016.01)

(52) U.S. Cl.
CPC ....... *G09G 3/32* (2013.01); *G09G 2310/0267* (2013.01); *G09G 2310/0286* (2013.01); *G09G 2330/021* (2013.01); *G09G 2330/06* (2013.01)

(58) Field of Classification Search
CPC ........................... G09G 3/3266; G09G 3/3677
See application file for complete search history.

(56) References Cited

U.S. PATENT DOCUMENTS 8,334,959 B2 * 12/2012 Hirabayashi ...... G02F 1/136204 349/40
11,468,812 B2 * 10/2022 Kim ......................... G09G 3/20
11,929,012 B2 * 3/2024 Park ......................... G09G 3/32
12,300,164 B2 * 5/2025 Jang ...................... G09G 3/3225
12,376,438 B2 * 7/2025 Lee ........................ G09F 9/3026
12,418,174 B2 * 9/2025 Kim ........................ H02H 9/045
12,525,176 B2 * 1/2026 Dai .......................... G09G 3/32
2008/0055505 A1 * 3/2008 Yeh ................... G02F 1/136204 349/40
2008/0135846 A1 * 6/2008 Shin .................. H10D 86/0231 257/E27.111
2014/0361301 A1 * 12/2014 Huang ................... G09G 3/006 438/34
2015/0092128 A1 * 4/2015 Lee ..................... G02F 1/13452 349/40
2016/0027372 A1 * 1/2016 Yan .......................... G09G 3/20 345/211
2016/0267831 A1 * 9/2016 Seo ...................... G09G 3/2085
2018/0138256 A1 * 5/2018 Han ................... H10K 59/1213
2019/0304386 A1 * 10/2019 Kim ......................... G09G 3/30
(Continued)

FOREIGN PATENT DOCUMENTS

CN 104882451 A 9/2015
CN 107561799 A 1/2018

*Primary Examiner* — Sephehr Azari
(74) *Attorney, Agent, or Firm* — Anova Law Group, PLLC

(57) ABSTRACT

The present disclosure discloses a display panel. The display panel includes a scan circuit, a first signal line, and an electrostatic protection unit. The scan circuit includes a plurality of shift registers, where the plurality of shift registers are arranged along a first direction and cascaded. The first signal line is connected to the scan circuit and provides a signal to the scan circuit. The scan circuit and the first signal line are both located in a display region. The electrostatic protection unit is located in the display region and electrically connected to the first signal line.

20 Claims, 15 Drawing Sheets

(56) References Cited

U.S. PATENT DOCUMENTS

| | | | | |
|---|---|---|---|---|
| 2021/0201736 | A1* | 7/2021 | You | G09G 3/20 |
| 2021/0217353 | A1* | 7/2021 | Zhao | G09G 3/32 |
| 2021/0375197 | A1* | 12/2021 | Dai | G09G 3/32 |
| 2022/0351662 | A1* | 11/2022 | You | G09G 3/3233 |
| 2023/0307489 | A1* | 9/2023 | Lou | H10H 29/142 |
| 2024/0006421 | A1* | 1/2024 | Xu | H10D 86/60 |
| 2024/0381711 | A1* | 11/2024 | Qu | H10D 86/40 |
| 2025/0081610 | A1* | 3/2025 | Xiao | G09G 3/3266 |

* cited by examiner

DISPLAY PANEL AND DISPLAY DEVICE

CROSS-REFERENCES TO RELATED APPLICATIONS

The present disclosure claims priority to Chinese Patent Application No. 202510217339.5, filed on Feb. 26, 2025, the content of which is incorporated herein by reference in its entirety.

TECHNICAL FIELD

The present disclosure relates to the field of display technology, and more specifically, relates to a display panel and a display device.

BACKGROUND

With the continuous advancement of science and technology, a plurality of display products, such as mobile phones, tablet computers, notebook computers, and smart wearable devices, have been widely applied in people's daily life and work, bringing great convenience and becoming indispensable tools in modern life.

The influence of static electricity in the environment may adversely affect the display performance of display products. Therefore, how to improve the anti-static capability of display products is one of the urgent technical problems that require a solution at this stage.

SUMMARY

One aspect of the present disclosure provides a display panel. The display panel includes a scan circuit, a first signal line, and an electrostatic protection unit. The scan circuit includes a plurality of shift registers, where the plurality of shift registers are arranged along a first direction and cascaded. The first signal line is connected to the scan circuit and provides a signal to the scan circuit. The scan circuit and the first signal line are both located in a display region. The electrostatic protection unit is located in the display region and electrically connected to the first signal line.

Another aspect of the present disclosure provides a display device, including a display panel. The display panel includes a scan circuit, a first signal line, and an electrostatic protection unit. The scan circuit includes a plurality of shift registers, where the plurality of shift registers are arranged along a first direction and cascaded. The first signal line is connected to the scan circuit and provides a signal to the scan circuit. The scan circuit and the first signal line are both located in a display region. The electrostatic protection unit is located in the display region and electrically connected to the first signal line.

BRIEF DESCRIPTION OF THE DRAWINGS

The drawings described herein are incorporated into and form part of the present disclosure, illustrating embodiments consistent with the present disclosure and, together with the description, serving to explain the principles of the present disclosure.

To provide a clearer illustration of the technical solutions in some embodiments of the present disclosure, the drawings used in the descriptions of the embodiments are briefly introduced below. It should be understood that those skilled in the art may derive other drawings based on these drawings without performing inventive work.

DETAILED DESCRIPTION

To facilitate a clearer understanding of the objectives, features, and advantages of the present disclosure, the following provides a more detailed description of the technical solutions. It should be noted that, when there is no conflict, embodiments of the present disclosure and features of different embodiments may be combined.

In the following description, numerous specific details are set forth to provide a thorough understanding of the present disclosure. However, the present disclosure may also be implemented in ways different from those described herein. Apparently, the embodiments described in the specification represent only some embodiments of the present disclosure and are not exhaustive.

Figure 1:
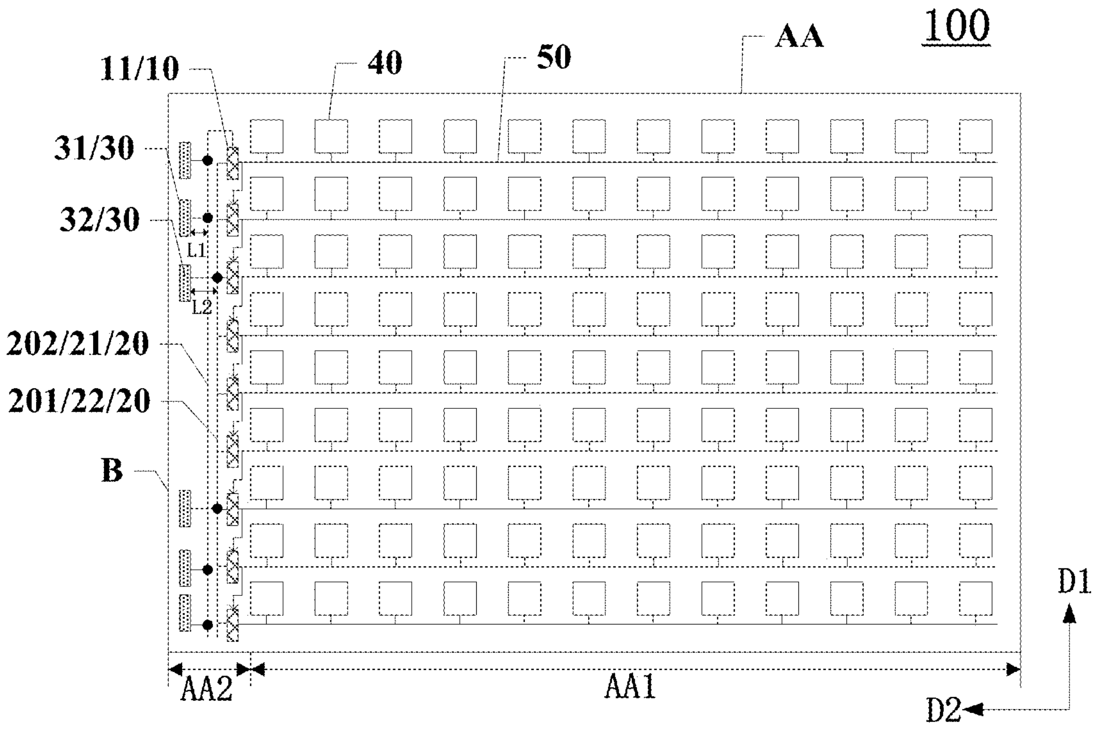
FIG. 1 illustrates a planar structural schematic diagram of a display panel in accordance with some embodiments of the present disclosure.

FIG. 1 illustrates a planar structural schematic diagram of a display panel according to some embodiments of the present disclosure. Referring to FIG. 1, the present disclosure provides a display panel 100. The display panel 100 includes a scan circuit 10 and a first signal line 20, where the first signal line 20 is connected to the scan circuit 10 and configured to provide a signal to the scan circuit 10. The scan circuit 10 and the first signal line 20 are both located in a display region AA. The scan circuit 10 includes a plurality of shift registers 11, which are arranged in a first direction D1 and cascaded. The display panel 100 further includes an electrostatic protection unit 30 arranged in the display region AA, where the electrostatic protection unit 30 is electrically connected to the first signal line 20.

FIG. 1 illustrates a display panel 100 having a rectangular structure as an example, without limiting the actual shape of the display panel 100. In some embodiments of the present disclosure, the display panel 100 may take other feasible shapes, such as circular or rounded-rectangle configurations. Optionally, the display panel 100 provided herein may be a display panel utilizing inorganic light-emitting diode display technology, such as a Micro LED display panel or a Mini LED display panel. Such display panels offer advantages including high brightness, low power consumption, and ease of splicing, making them widely applicable in display products. In this case, the light-emitting element of the display panel may be a Micro LED or a Mini LED.

Figure 2:
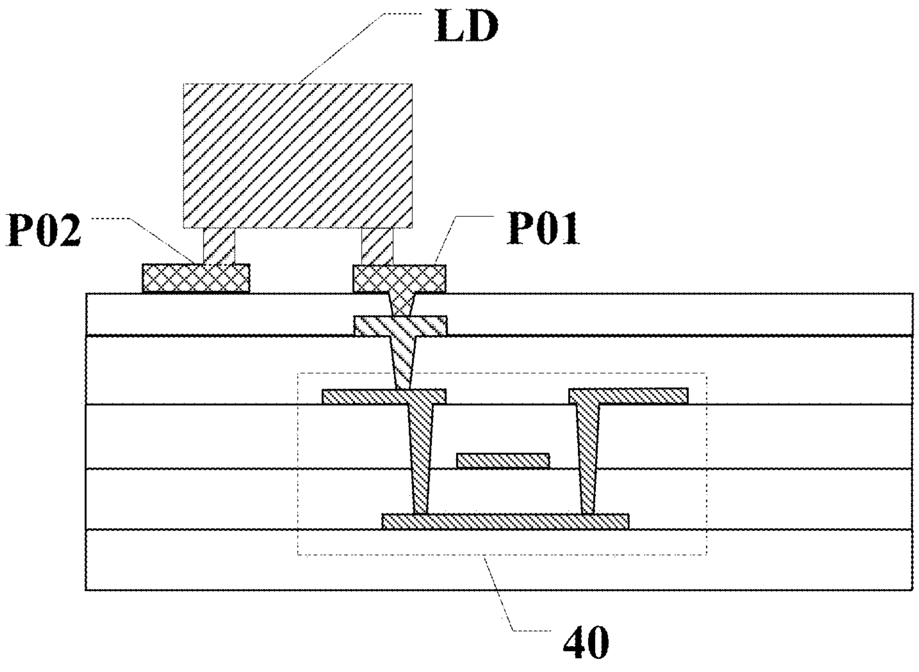
FIG. 2 illustrates a schematic diagram of a film layer of a display panel in accordance with some embodiments of the present disclosure.

The connection of the light-emitting element in the display panel may be referenced in FIG. 2. FIG. 2 illustrates a schematic diagram of a film layer of a display panel according to some embodiments of the present disclosure. As shown in FIG. 2, the electrode of the light-emitting element LD may be bonded to an anode pad P01 and a cathode pad P02, thereby establishing an electrical connection with a pixel driving circuit 40 of the display panel 100. It should be noted that FIG. 2 merely illustrates one example of a film layer structure of the display panel 100 and does not limit the number or size of the actual film layers. In some embodiments of the present disclosure, the display panel 100 may also be an organic light-emitting display panel, where the corresponding light-emitting element LD is an organic light-emitting element (e.g., an OLED). The present disclosure is not limited in this regard.

For the purpose of clearly illustrating the relative positional relationship among the scan circuit 10, the first signal line 20, and the electrostatic protection unit 30, FIG. 1 does not depict other structures of the display panel 100, such as the light-emitting element LD. Additionally, in FIG. 1, the pixel driving circuit 40 is schematically illustrated as a rectangular structure, but this does not limit the number or arrangement of the pixel driving circuit 40. Furthermore, in FIG. 1, the position of the scan circuit 10 in the display region AA is merely exemplary. FIG. 1 illustrates a scenario in which a group of scan circuits 10 is introduced into the display panel 100, and the scan circuit 10 is arranged in an edge region of the display region AA. However, the present disclosure is not limited to this arrangement.

Figure 3:
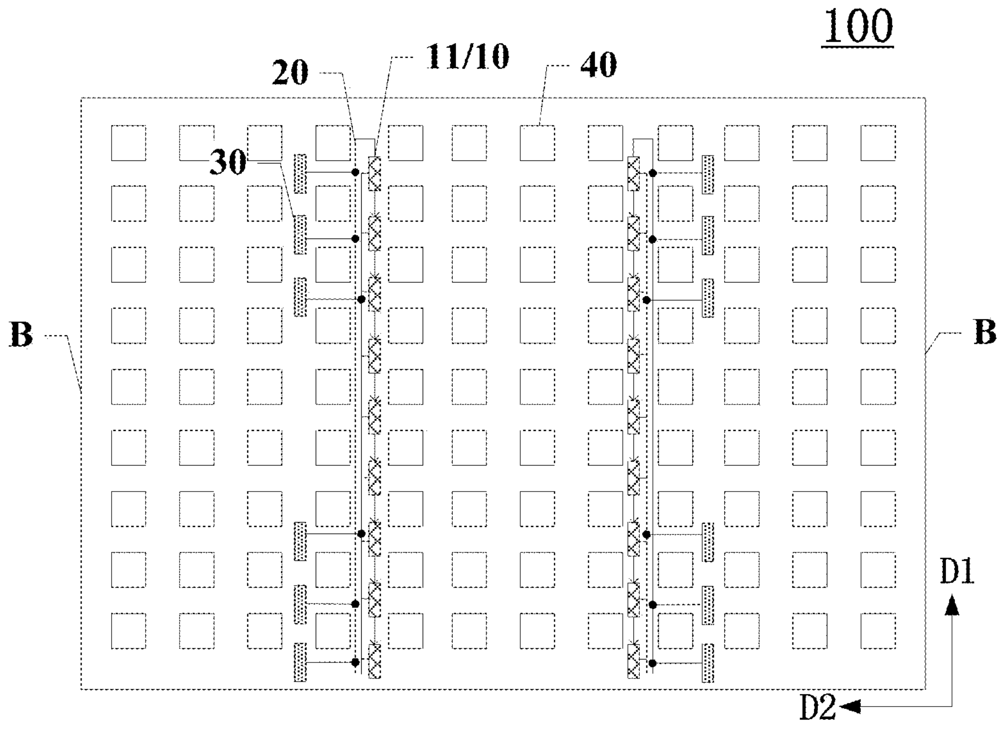
FIG. 3 illustrates another planar structural schematic diagram of a display panel in accordance with some embodiments of the present disclosure.

For example, FIG. 3 illustrates another planar structural schematic diagram of a display panel according to some embodiments of the present disclosure. Referring to FIG. 3, two groups of scan circuits 10 are introduced into the display panel 100, where the two groups of scan circuits 10 are respectively arranged in the left and right half-screen regions of the display panel 100. Using two groups of scan circuits 10 to drive the pixel driving circuits 40 may improve the transmission efficiency and reliability of scan signals.

Figure 4:
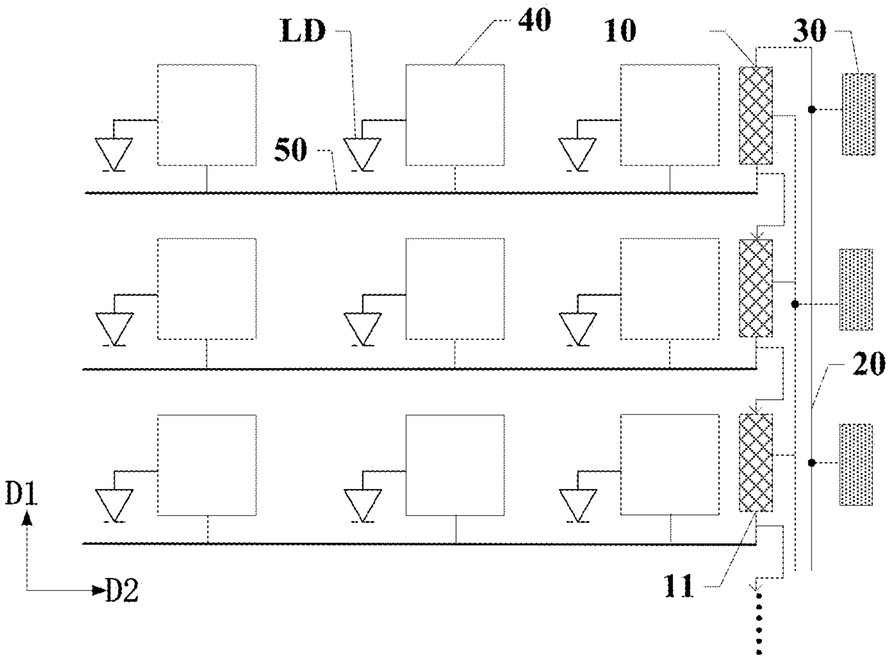
FIG. 4 illustrates a schematic diagram of a connection among a scan circuit, a first signal line, a light-emitting element, and a pixel driving circuit in accordance with some embodiments of the present disclosure.

FIG. 4 illustrates a schematic diagram of a connection among a scan circuit, a first signal line, a light-emitting element, and a pixel driving circuit according to some embodiments of the present disclosure. As shown in FIG. 4, the pixel driving circuit 40 is electrically connected to the light-emitting element LD and is configured to drive the light-emitting element LD to emit light. FIG. 4 further illustrates a scan line 50. Optionally, the scan circuit 10 includes a plurality of cascaded shift registers 11, which are arranged in a first direction D1. The output terminal of each shift register 11 is connected to the scan line 50, and the scan line 50 is further electrically connected to the pixel driving circuit 40. The shift register 11 provide control signals to the pixel driving circuit 40 via the scan line 50. The control signals may include, for example, a reset control signal, a data write-in control signal, a light-emission control signal, and the like. The control signals generated by the scan circuit 10 are transmitted to the pixel driving circuit 40 through the scan line 50, thereby controlling the operation of the pixel driving circuit 40. The specific structure of the pixel driving circuit 40 may be referenced from related technologies and is not specifically limited in the present disclosure.

Figure 5:
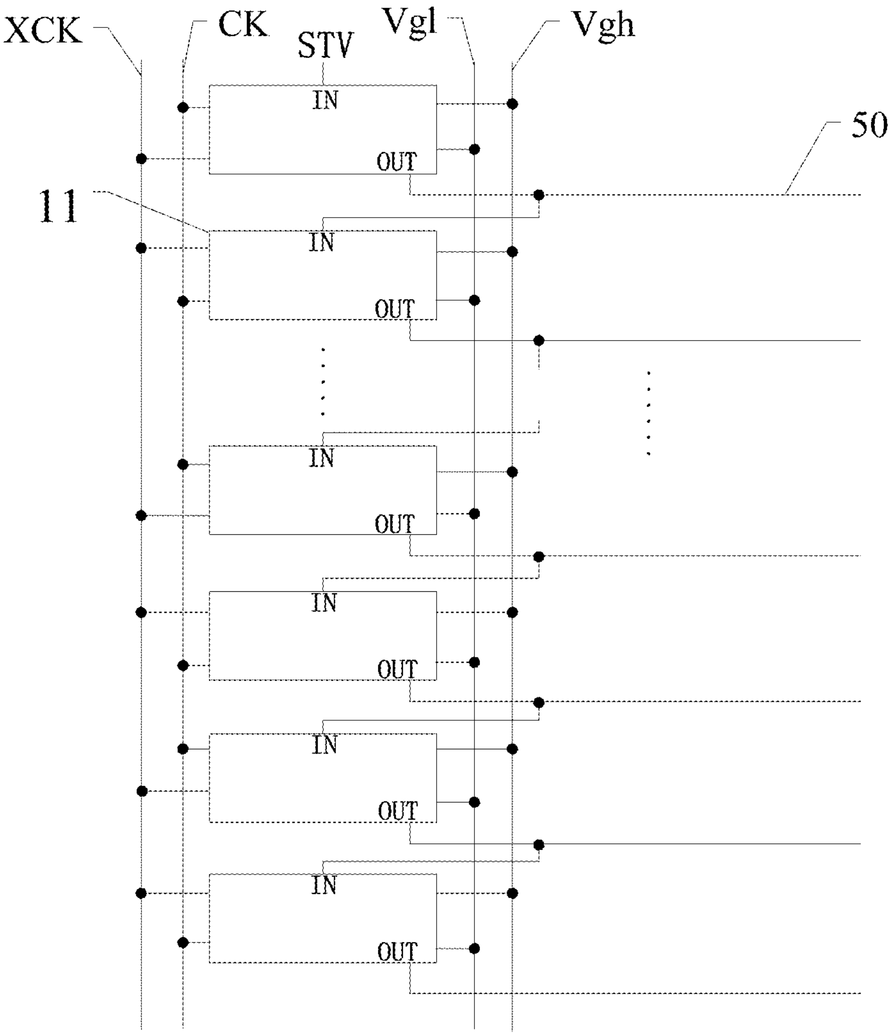
FIG. 5 illustrates a schematic diagram of a scan circuit in accordance with some embodiments of the present disclosure.

FIG. 5 illustrates a schematic diagram of a scan circuit according to some embodiments of the present disclosure. Referring to FIG. 5, a plurality of shift registers 11 are cascaded, where the input terminal IN of the first stage shift register 11 is connected to a start trigger signal line STV. The output terminal OUT of each shift register 11, except for the first stage shift register, is connected to the output terminal of the preceding shift register 11. Each shift register 11 is connected to at least one of a first clock signal line XCK, a second clock signal line CK, a first power voltage signal line Vgh, and a second power voltage signal line Vgl. In some embodiments of the present disclosure, the first signal line 20 includes at least one of the first clock signal line XCK, the second clock signal line CK, the start trigger signal line STV, the first power voltage signal line Vgh, and the second power voltage signal line Vgl. The first clock signal line XCK and the second clock signal line CK are configured to provide clock signals to the shift register 11. The start trigger signal line STV is configured to provide a start trigger signal to the shift register 11. The first power voltage signal line Vgh and the second power voltage signal line Vgl are configured to provide power voltage signals to the shift register 11. In some other embodiments of the present disclosure, the first signal line 20 may further include other types of signal lines, such as a control signal line configured to provide control signals to the shift register 11 to determine whether the shift register 11 output valid levels of scan signals. The present disclosure does not impose specific limitations in this regard, and the specific structure of the shift register 11 may be referenced from related technologies.

It should also be noted that in FIG. 1, FIG. 3, FIG. 4, and FIG. 5, the shift register 11, the first signal line 20, and the electrostatic protection unit 30 are schematically illustrated and do not impose limitations on the actual number or positions of the shift register 11, the first signal line 20, and the electrostatic protection unit 30 included in the display panel 100. The specific structure of the electrostatic protection unit 30 will be further described in subsequent embodiments. FIG. 1, FIG. 3, and FIG. 4 illustrate an example in which the shift register 11 are arranged in a region between columns of pixel driving circuits 40. However, the present disclosure is not limited to this configuration. In some other embodiments of the present disclosure, the shift register 11 may be arranged in a region between adjacent rows of pixel driving circuits 40. This configuration will be further described in subsequent embodiments.

Referring to FIGS. 1-5, according to some embodiments of the present disclosure, in the display panel 100, the scan circuit 10 is arranged in the display region AA and is configured to provide signals to the shift register circuits 11 through the first signal line 20, which is located in the display region AA. Meanwhile, the electrostatic protection unit 30 is also arranged in the display region AA. Since the scan circuit 10 and the electrostatic protection unit 30 no longer occupy space in the non-display region of the display panel 100, the display panel 100 may either eliminate the non-display region or reduce its width, thereby facilitating the realization of a borderless or ultra-narrow bezel design. This configuration improves the screen-to-body ratio of display products and enhances the visual experience. For borderless or ultra-narrow bezel display products, the internal components of the display panel 100 are positioned closer to the edges of the display panel 100. When electrostatic discharge (ESD) occurs on the first signal line 20, which is connected to the scan circuit 10, the electrostatic charge may be transmitted through the first signal line 20 to the scan circuit 10, potentially disrupting its normal operation or even damaging the associated circuit structures. To address this issue, referring to FIGS. 1, 3, and 4, according to some embodiments of the present disclosure, the electrostatic protection unit 30 is introduced into the display region AA, and the first signal line 20 is electrically connected to the electrostatic protection unit 30. When the display panel 100 is exposed to electrostatic discharge, the electrostatic charge acting on the first signal line 20 may be discharged through the electrostatic protection unit 30, thereby preventing disruption to the normal operation of the scan circuit 10 and ensuring normal display performance of the display panel 100. Consequently, this configuration enhances the overall electrostatic resistance capability of the display panel 100.

Referring to FIGS. 1 and 3, in some embodiments of the present disclosure, the first signal line 20 extends along a first direction D1.

Specifically, the first signal line 20 functions as a routing trace that provides signals to the shift register 11. The shift register 11 are arranged in the scan circuit 10 along the first direction D1. The first signal line 20 extends along the first direction D1. It should be noted that the phrase "the first signal line 20 extends along the first direction D1" means that the main routing direction of the first signal line 20 generally follows the first direction D1, but it is not limited to all details of the first signal line 20 strictly extending along the first direction D1.

It should also be noted that the number of first signal lines 20 shown in FIGS. 1 and 3 does not represent the actual number of first signal lines 20 present in the display panel 100. Similarly, the number of electrostatic protection units 30 connected to a single first signal line 20 does not represent the actual number of electrostatic protection units 30. These figures are provided for illustrative purposes only and are not intended to limit the present disclosure.

Please continue referring to FIGS. 1 and 3. In some embodiments of the present disclosure, at least some electrostatic protection units 30 are arranged on at least one side of the shift register 11 along a second direction D2. The second direction D2 intersects with the first direction D1 and is parallel to the light-emitting surface of the display panel 100.

The present disclosure introduces the electrostatic protection unit 30 into the display region AA and electrically connects the first signal line 20 to the electrostatic protection unit 30. When the display panel 100 is subjected to electrostatic discharge, the electrostatic charge acting on the first signal line 20 may be discharged through the electrostatic protection unit 30, preventing interference with the normal operation of the scan circuit 10, and thereby ensuring the normal display performance of the display panel 100. This embodiment provides a configuration for arranging the electrostatic protection unit 30, where the electrostatic protection unit 30 is positioned on at least one side of the shift register 11 along the second direction D2. As illustrated in FIGS. 1 and 3, the electrostatic protection units 30 and the shift register 11 are arranged along the second direction D2 (horizontally), with the electrostatic protection units 30 positioned on the left or right side of the shift register 11. This configuration reduces the space occupied by the electrostatic protection units 30 and shift registers 11 along the first direction D1. Optionally, when the shift register 11 is positioned near the edge of the display panel 100, arranging the electrostatic protection units 30 on the side of the shift register 11 facing the edge of the display panel 100 along the second direction D2 may further reduce or prevent the impact of electrostatic conduction from the display panel edge.

Figure 6:
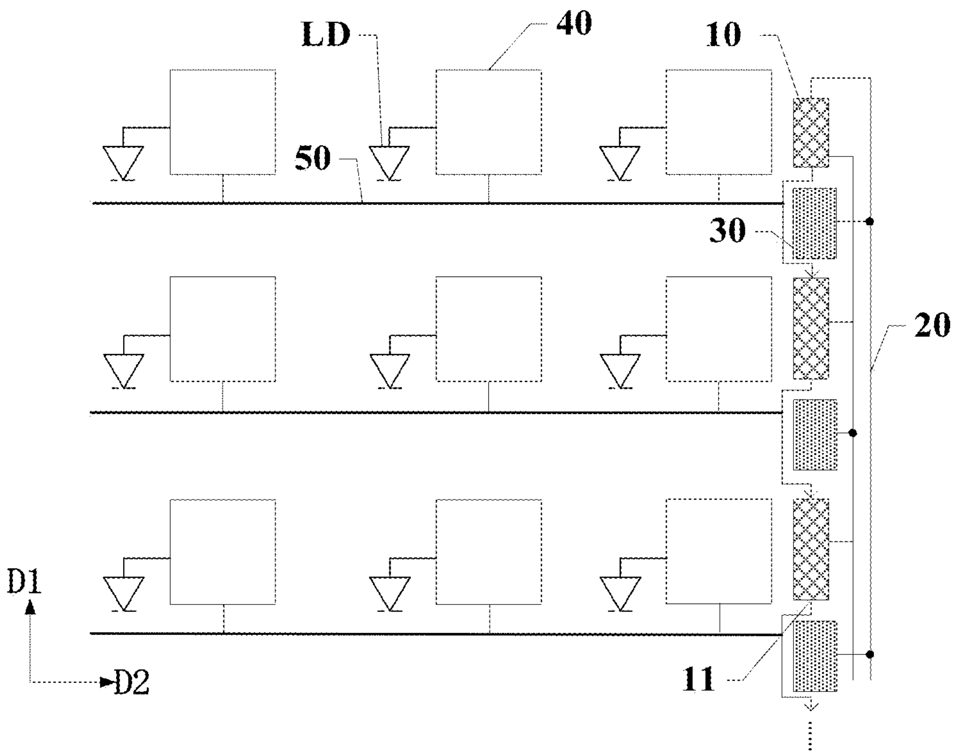
FIG. 6 illustrates another schematic diagram of a connection among a scan circuit, a first signal line, a light-emitting element, and a pixel driving circuit in accordance with some embodiments of the present disclosure.

FIG. 6 is a schematic diagram illustrating another connection among the scan circuit, the first signal line, the light-emitting element, and the pixel driving circuit according to some embodiments of the present disclosure. Referring to FIG. 6, in an some embodiments, at least some electrostatic protection units 30 are arranged on at least one side of the shift register 11 along the first direction D1.

It should be noted that, for clarity in the drawings, some interconnections among the shift register 11 are not shown in certain figures. However, in practice, the shift register 11 are cascaded.

According to some embodiments of the present disclosure, the electrostatic protection units 30 may also be arranged along the first direction D1 on at least one side of the shift register 11. As shown in FIG. 6, the electrostatic protection units 30 and the shift register 11 are arranged in the first direction D1 (vertically), with the electrostatic protection units 30 positioned above or below the shift register 11. This configuration reduces the space occupied by the electrostatic protection units 30 and shift registers 11 along the second direction D2. When the shift register 11 and electrostatic protection units 30 are located near the edge of the display panel 100, this arrangement facilitates the reduction of the display panel bezel width, making it more conducive to achieving an ultra-narrow bezel or borderless display panel design. Additionally, the electrostatic protection units 30 are connected to the first signal line 20. When the display panel 100 is subjected to electrostatic discharge, the electrostatic protection units 30 may discharge the electrostatic charge acting on the first signal line 20, thereby preventing disruption to the normal operation of the scan circuit 10 and improving the electrostatic resistance capability of the display panel 100.

It should also be noted that, in the embodiments illustrated in FIGS. 1 and 3, the electrostatic protection units 30 are arranged on at least one side of the shift register 11 along the second direction D2, while in some embodiments illustrated in FIG. 6, the electrostatic protection units 30 are arranged on at least one side of the shift register 11 along the first direction D1. However, the present disclosure is not limited to these arrangements. In some other embodiments of the present disclosure, some electrostatic protection units 30 may be arranged on at least one side of the shift register 11 along the first direction D1, while other electrostatic protection units 30 may be arranged on at least one side of the shift register 11 along the second direction D2. Relevant embodiments will be described below, and in practical implementations, the configuration may be designed based on actual requirements.

Figure 7:
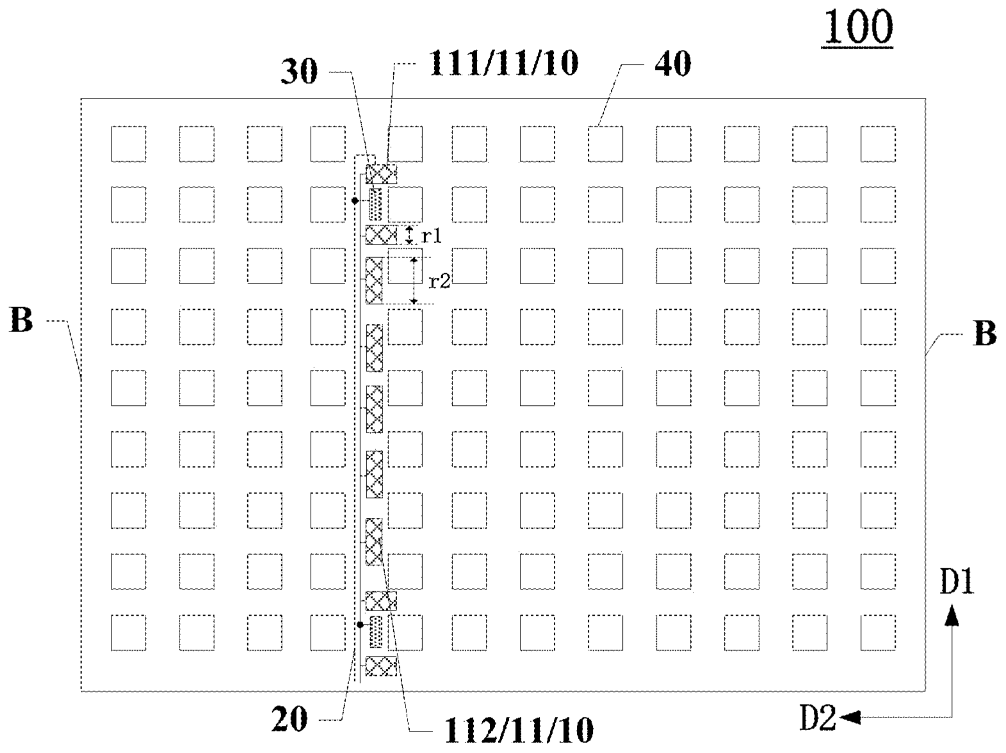
FIG. 7 illustrates still another planar structural schematic diagram of a display panel in accordance with some embodiments of the present disclosure.

FIG. 7 is a schematic diagram illustrating another planar structure of a display panel according to some embodiments of the present disclosure. Referring to FIG. 7, in some embodiments, the cascaded shift registers 11 include a first shift register 111 and a second shift register 112. Along the first direction D1, the first shift register 111 is positioned between the electrostatic protection unit 30 and the second shift register 112, with the first shift register 111 adjacent to the electrostatic protection unit 30. Along the first direction D1, the width r1 of the first shift register 111 is smaller than the width r2 of the second shift register 112.

In some embodiments, the electrostatic protection unit 30 is arranged on at least one side of the shift register 11 along the first direction D1, and the electrostatic protection unit 30 and the shift register 11 are arranged along the first direction D1. The shift register 11 include a first shift register 111 and a second shift register 112, where the first shift register 111 is positioned between the second shift register 112 and the electrostatic protection unit 30. It should be noted that additional first shift registers 111 may be arranged between the first shift register 111 and the second shift register 112, or no additional first shift registers 111 may be included. The second shift register 112 in the present embodiment may be regarded as a shift register that is not adjacent to the electrostatic protection unit 30 along the first direction D1. That is, the second shift register 112 does not have an electrostatic protection unit 30 positioned above or below it along the first direction D1. In contrast, the first shift register 111 may be regarded as a shift register that is adjacent to the electrostatic protection unit 30 along the first direction D1. Specifically, the electrostatic protection unit 30 is positioned either above or below the first shift register 111. By reducing the width of the first shift register 111 along the first direction D1, installation space is provided for the electrostatic protection unit 30. Accordingly, in the present embodiment, the width r1 of the first shift register 111 along the first direction D1 is smaller than the width r2 of the second shift register 112 along the first direction D1, thereby providing installation space for the electrostatic protection unit 30 adjacent to the first shift register 111. This configuration accommodates the installation space requirements of the electrostatic protection unit 30, while also optimizing the overall space occupied by the shift register 11 and the electrostatic protection unit 30 along the second direction D2, facilitating an ultra-narrow bezel or borderless display panel design.

Please refer to FIGS. 1 and 7. In some embodiments of the present disclosure, the shift register 11 include a plurality of transistors, and at least some transistors in the first shift register 111 have a width-to-length ratio that is smaller than the width-to-length ratio of at least some transistors in the second shift register 112.

It should be noted that the shift register 11 may include a plurality of transistors and may further include a capacitor. The specific structure of the shift register 11 may be referenced from related technologies and is not specifically limited in the present disclosure. To reduce the width r1 of the first shift register 111 along the first direction D1, the present embodiment reduces the width-to-length ratio of at least some transistors in the first shift register 111, thereby reducing the size of at least some transistors in the first shift register 111. As a result, the overall size of the first shift register 111 is reduced, such that the width r1 of the first shift register 111 along the first direction D1 is smaller than the width r2 of the second shift register 112 along the second direction D2. This configuration provides installation space for the electrostatic protection unit 30 adjacent to the first shift register 111, reduces the impact of electrostatic discharge on the scan circuit 10, and improves the electrostatic resistance capability of the display panel 100.

Figure 8:
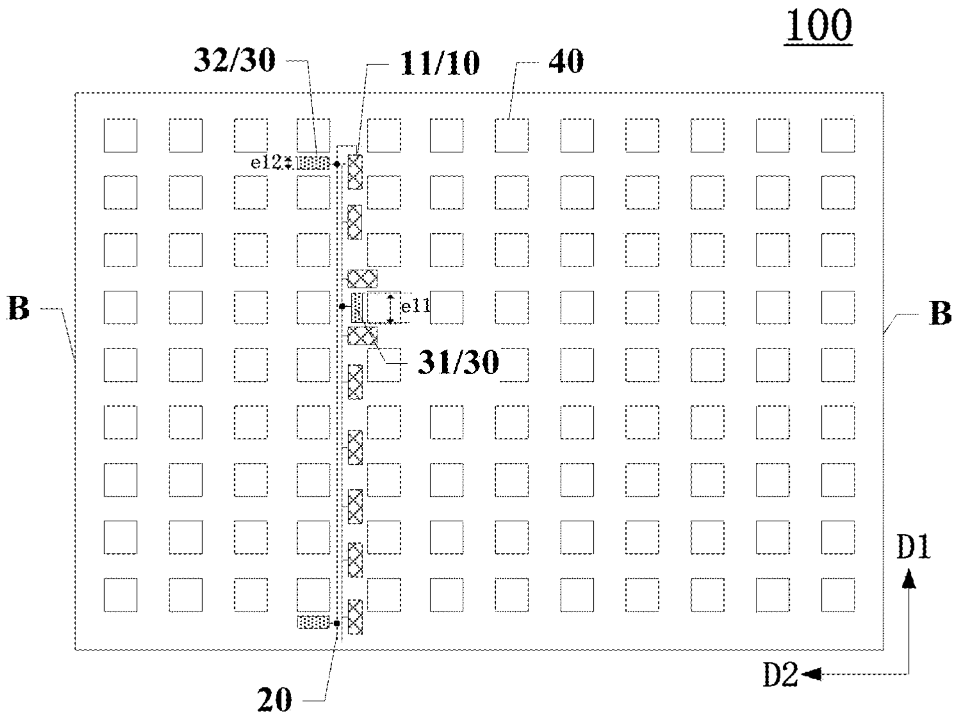
FIG. 8 illustrates yet another planar structural schematic diagram of a display panel in accordance with some embodiments of the present disclosure.

FIG. 8 illustrates another planar structural schematic diagram of a display panel according to some embodiments of the present disclosure. Referring to FIG. 8, in some embodiments of the present disclosure, at least some electrostatic protection units 30 are arranged on at least one side of the shift register 11 along the second direction D2, and at least some electrostatic protection units 30 are arranged on at least one side of the shift register 11 along the first direction D1, where the second direction D2 intersects with the first direction D1 and is parallel to the light-emitting surface of the display panel 100.

Specifically, the electrostatic protection unit 30 may be arranged on one or both sides of the shift register 11 along the second direction D2, or on one or both sides of the shift register 11 along the first direction D1. In the present embodiment, some electrostatic protection units 30 are arranged on one side of the shift register 11 along the second direction D2, while other electrostatic protection units 30 are arranged on one side of the shift register 11 along the first direction D1. This configuration allows for the relative positioning of the electrostatic protection units 30 and the shift register 11 to be adjusted as needed, preventing the electrostatic protection units 30 from occupying excessive longitudinal space, thereby optimizing the use of the display panel's space to accommodate the installation requirements of the electrostatic protection units 30.

Please continue referring to FIG. 8. The electrostatic protection unit 30 arranged on at least one side of the shift register 11 along the first direction D1 is referred to as a first electrostatic protection unit 31, while the electrostatic protection unit 30 arranged on at least one side of the shift register 11 along the second direction D2 is referred to as a second electrostatic protection unit 32. The width e11 of the first electrostatic protection unit 31 along the first direction D1 is different from the width e12 of the second electrostatic protection unit 32 along the first direction D1.

Specifically, the electrostatic protection unit 30 may be arranged on at least one side of the shift register 11 along the first direction D1, where the electrostatic protection unit 30 positioned along the first direction D1 is referred to as the first electrostatic protection unit 31. Alternatively, the electrostatic protection unit 30 may be arranged on at least one side of the shift register 11 along the second direction D2, where the electrostatic protection unit 30 positioned along the second direction D2 is referred to as the second electrostatic protection unit 32. When the electrostatic protection unit 30 is arranged at different locations, the width of the electrostatic protection unit 30 along the first direction D1 may be adjusted to allow for a reasonable arrangement of the electrostatic protection unit 30 within the display region AA. Accordingly, in the present disclosure, the width e11 of the first electrostatic protection unit 31 along the first direction D1 is different from the width e12 of the second electrostatic protection unit 32 along the first direction D1. Various embodiments illustrating this configuration are described below.

Figure 9:
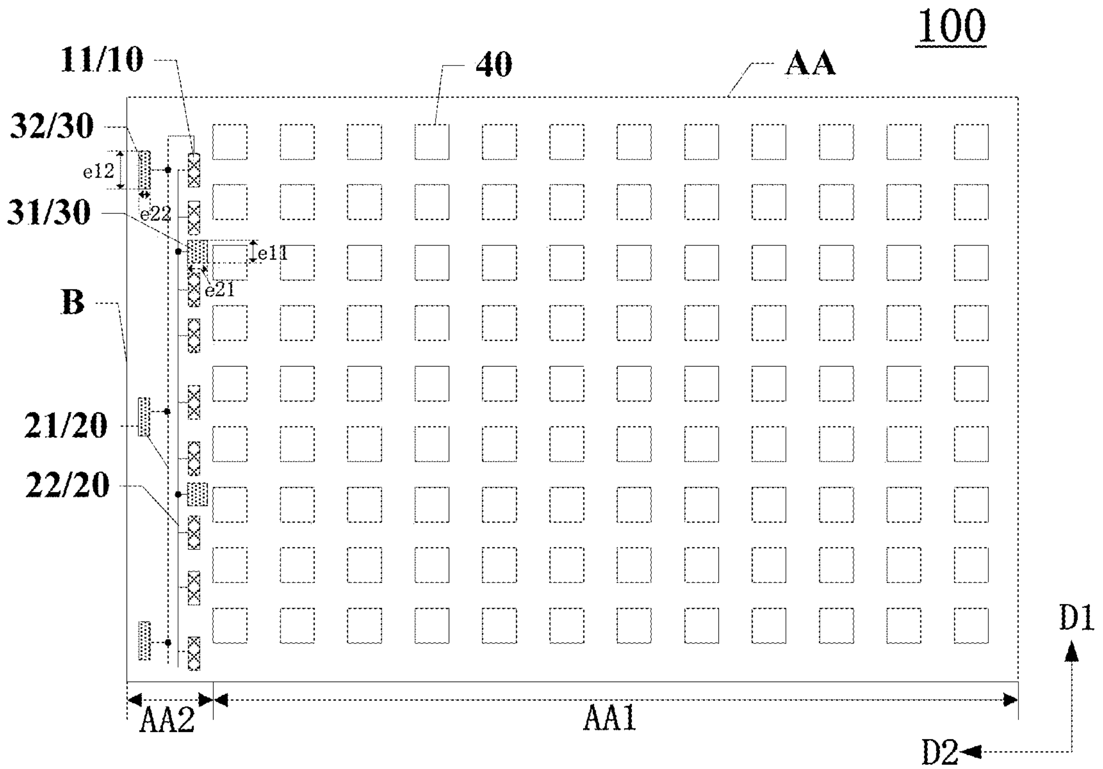
FIG. 9 illustrates yet another planar structural schematic diagram of a display panel in accordance with some embodiments of the present disclosure.

FIG. 9 illustrates another planar structural schematic diagram of a display panel according to some embodiments of the present disclosure. Referring to FIG. 9, in some embodiments of the present disclosure, the electrostatic protection unit 30 and the shift register 11 are arranged in the edge region of the display region AA. The electrostatic protection unit 30 includes both a first electrostatic protection unit 31 and a second electrostatic protection unit 32. The first electrostatic protection unit 31 is arranged on at least one side of the shift register 11 along the first direction D1. Compared to the second electrostatic protection unit 32, the space available for the first electrostatic protection unit 31 along the first direction D1 is smaller than the space available for the second electrostatic protection unit 32. Therefore, in the present embodiment, the width e11 of the first electrostatic protection unit 31 along the first direction D1 is set to be smaller than the width e12 of the second electrostatic protection unit 32 along the first direction D1. This configuration reduces the space occupied by the first electrostatic protection unit 31 along the first direction D1, thereby facilitating the arrangement of the shift register 11 and the first electrostatic protection unit 31 along the first direction D1.

Figure 10:
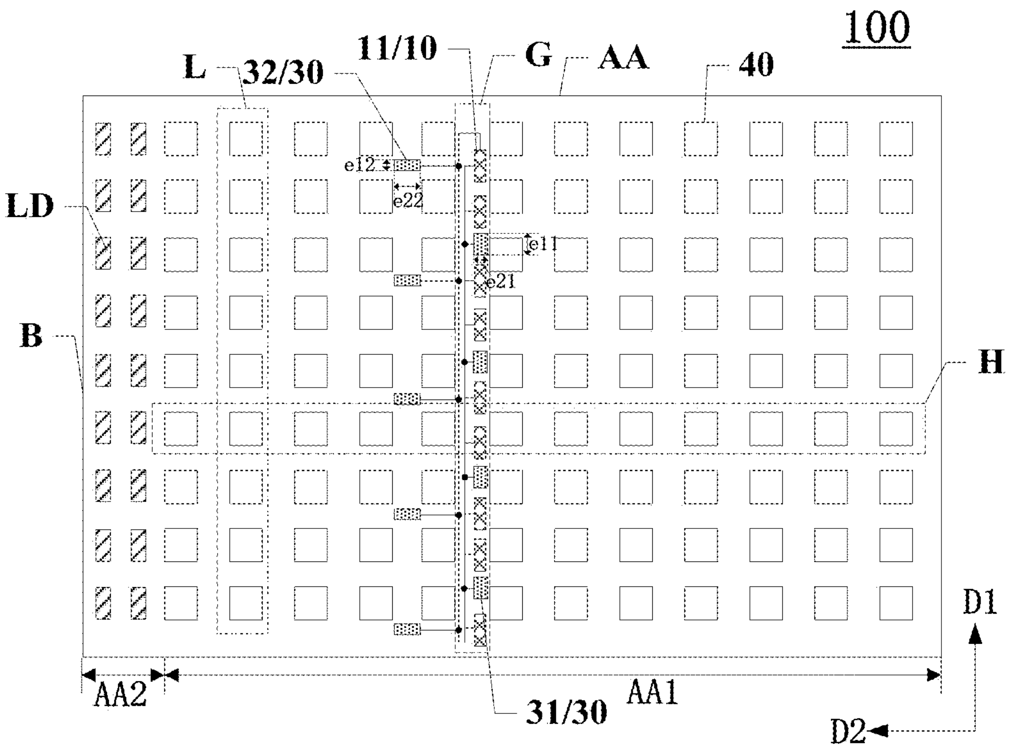
FIG. 10 illustrates yet another planar structural schematic diagram of a display panel in accordance with some embodiments of the present disclosure.

FIG. 10 illustrates another planar structural schematic diagram of a display panel according to some embodiments of the present disclosure. Referring to FIG. 10, in some embodiments of the present disclosure, the electrostatic protection unit 30 and the shift register 11 are positioned in a region between the pixel driving circuits. Specifically, the first electrostatic protection unit 31 and the shift register 11 are arranged between columns of pixel driving circuits, while the second electrostatic protection unit 32 is arranged between rows of pixel driving circuits. In this case, along the first direction D1, the available space for arranging the first electrostatic protection unit 31 is greater than the available space for arranging the second electrostatic protection unit 32. Accordingly, the width e11 of the first electrostatic protection unit 31 along the first direction D1 is greater than the width e12 of the second electrostatic protection unit 32 along the first direction D1. It should be noted that the width of the pixel driving circuit 40 along the first direction D1 is typically greater than the width of the shift register 11 along the first direction D1, and the spacing between adjacent pixel driving circuits 40 is relatively small. In this case, the electrostatic protection units 30 may be arranged in a rational manner by increasing the width e11 of the first electrostatic protection unit 31 along the first direction D1, decreasing the width e21 of the first electrostatic protection unit 31 along the second direction D2, increasing the width e22 of the second electrostatic protection unit 32 along the second direction D2, and decreasing the width e12 of the second electrostatic protection unit 32 along the first direction D1. This configuration facilitates the optimal arrangement of the pixel driving circuit 40, the shift register 11, and the electrostatic protection unit 30 within the display panel 100.

Additionally, since the electrostatic protection unit 30 and the shift register 11 are arranged in the region between the pixel driving circuits 40, they do not occupy the peripheral space of the display panel 100, thereby contributing to the realization of a borderless or ultra-narrow bezel display panel design. Furthermore, when the electrostatic protection unit 30 is arranged in the edge region of the display panel 100, the active layer of the electrostatic protection unit 30 may be damaged due to module processing. By arranging the electrostatic protection unit 30 in the region between the pixel driving circuits 40, the structure of the electrostatic protection unit 30 is further protected, thereby enhancing the electrostatic discharge protection effectiveness of the electrostatic protection unit 30.

Referring to FIG. 9, when the electrostatic protection unit 30 and the shift register 11 are arranged in the edge region of the display region AA, the width e12 of the second electrostatic protection unit 32 along the first direction D1 may be increased, while the width e22 of the second electrostatic protection unit 32 along the second direction D2 may be reduced. This configuration reduces the space occupied by the electrostatic protection unit 30 along the second direction D2, preventing the electrostatic protection unit 30 from occupying excessive space in the edge region of the display panel 100, thereby facilitating the realization of a borderless or ultra-narrow bezel display panel design.

Figure 11:
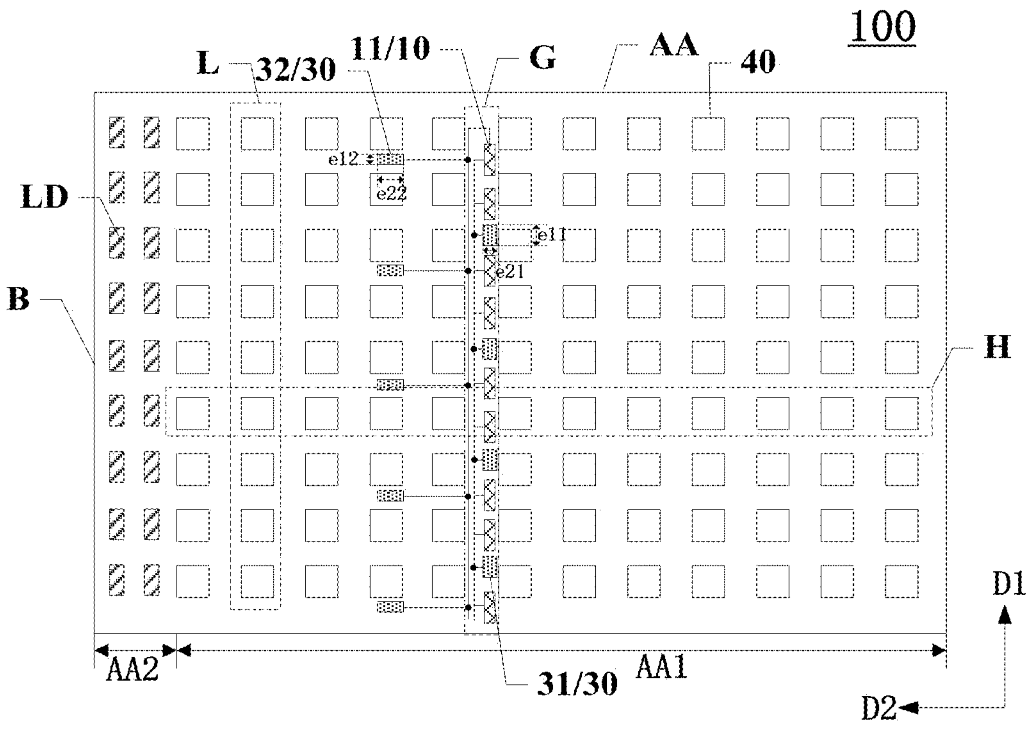
FIG. 11 illustrates yet another planar structural schematic diagram of a display panel in accordance with some embodiments of the present disclosure.

Referring to FIGS. 10 and 11, the electrostatic protection unit 30 and the shift register 11 are arranged in the region between the pixel driving circuits 40. FIG. 11 illustrates another planar structural schematic diagram of a display panel according to some embodiments of the present disclosure. The second electrostatic protection unit 32 may be arranged in at least two different configurations. Referring to FIG. 11, in one configuration, along the first direction D1, the second electrostatic protection unit 32 overlaps with the columns of pixel driving circuits, meaning that the second electrostatic protection unit 32 is positioned between adjacent pixel driving circuits 40 along the first direction D1. In this case, the width of the second electrostatic protection unit 32 along the second direction D2 may be increased while its width along the first direction D1 may be reduced. This configuration enables the second electrostatic protection unit 32 to be arranged efficiently while preventing it from occupying the spacing between adjacent pixel driving circuit columns. As a result, this configuration reduces or avoids interference with the original routing layout between adjacent pixel driving circuit columns. Referring to FIG. 10, in another configuration, along the first direction D1, the second electrostatic protection unit 32 does not overlap with the columns of pixel driving circuits, meaning that the second electrostatic protection unit 32 is positioned between adjacent pixel driving circuit columns. It should be noted that, in the pixel driving circuit columns, multiple routing traces extending along the second direction D2 are arranged between adjacent pixel driving circuits 40 along the first direction D1, such as reset signal lines, scan signal lines, and light-emission control signal lines. When the second electrostatic protection unit 32 is positioned between adjacent pixel driving circuit columns, reducing the width of the second electrostatic protection unit 32 along the first direction D1 may help minimize the overlap between the second electrostatic protection unit 32 and the routing traces within the pixel driving circuit columns, thereby reducing parasitic capacitance. When the second electrostatic protection unit 32 is positioned between adjacent pixel driving circuit columns, the width e22 of the second electrostatic protection unit 32 along the second direction D2 may be set equal to the width e21 of the first electrostatic protection unit 31 along the second direction D2. The present disclosure provides this configuration as an illustrative example and is not limited thereto.

It should be noted that, in practical applications, the first electrostatic protection unit 31 and the second electrostatic protection unit 32 may be designed with differentiated dimensions by varying the width-to-length ratio of the transistors included in the first electrostatic protection unit 31 and the second electrostatic protection unit 32.

Additionally, the above embodiments analyze the widths of the first electrostatic protection unit 31 and the second electrostatic protection unit 32 along both the first direction D1 and the second direction D2. In specific implementations, the dimensions and structures of the first electrostatic protection unit 31 and the second electrostatic protection unit 32 may be adjusted based on actual requirements to facilitate the optimal arrangement of the scan circuit 10 and the electrostatic protection unit 30 within the display region AA.

Please refer to FIG. 9. The electrostatic protection unit 30 arranged on at least one side of the shift register 11 along the first direction D1 is referred to as the first electrostatic protection unit 31, and the electrostatic protection unit 30 arranged on at least one side of the shift register 11 along the second direction D2 is referred to as the second electrostatic protection unit 32. The width e22 of the second electrostatic protection unit 32 along the second direction D2 is different from the width e21 of the first electrostatic protection unit 31 along the second direction D2.

The present disclosure provides a method for configuring the widths of the second electrostatic protection unit 32 and the first electrostatic protection unit 31 along the second direction D2. According to some embodiments of the present disclosure, the electrostatic protection unit 30 and the shift register 11 are arranged in the edge region of the display region AA (i.e., the region near edge B). The second electrostatic protection unit 32 is positioned on at least one side of the shift register 11 along the second direction D2. As disclosed herein, the width e22 of the second electrostatic protection unit 32 along the second direction D2 is set to be smaller than the width e21 of the first electrostatic protection unit 31 along the second direction D2. This configuration reduces the space occupied by the second electrostatic protection unit 32 along the first direction D1, thereby minimizing the space occupied by the shift register 11 and the electrostatic protection unit 30 along the second direction D2. As a result, this configuration facilitates the optimal arrangement of the electrostatic protection unit 30 and contributes to the realization of a borderless or ultra-narrow bezel design for the display panel 100.

Figure 12:
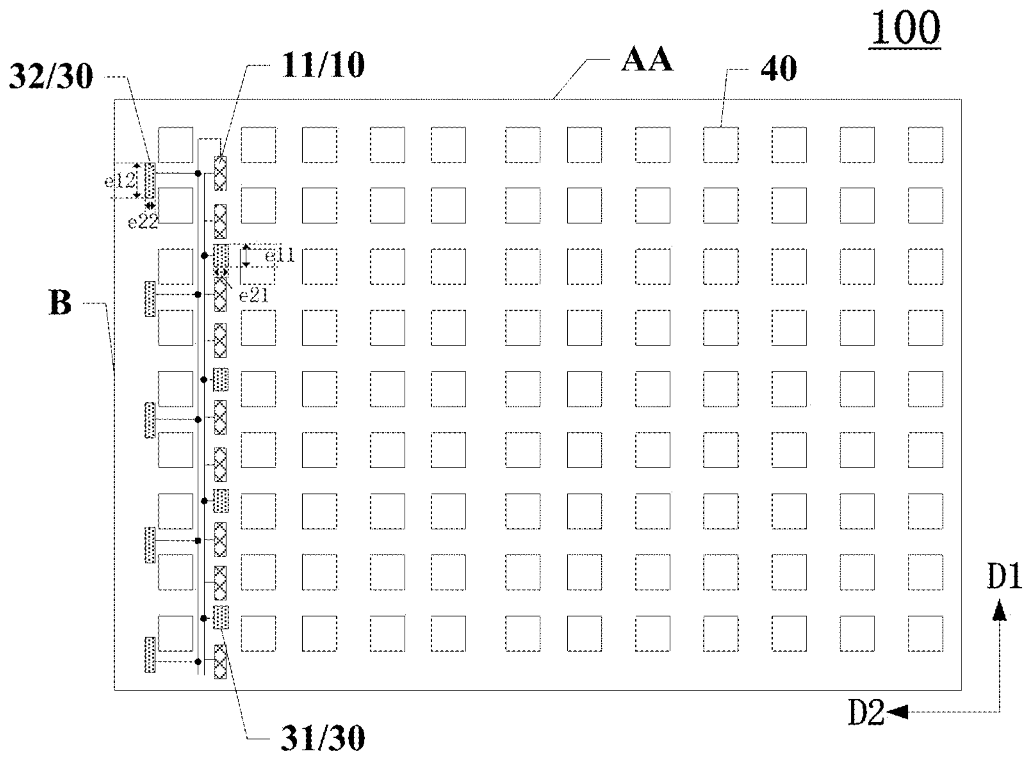
FIG. 12 illustrates yet another planar structural schematic diagram of a display panel in accordance with some embodiments of the present disclosure.

FIG. 12 illustrates another planar structural schematic diagram of a display panel according to some embodiments of the present disclosure. Referring to FIG. 12, the second electrostatic protection unit 32 is arranged in the edge region of the display region AA, while the first electrostatic protection unit 31 and the shift register 11 are arranged between the columns of pixel driving circuits. As disclosed, there is relatively ample space for the second electrostatic protection unit 32 along the first direction D1. Accordingly, the width e12 of the second electrostatic protection unit 32 along the first direction D1 may be increased, while the width e22 of the second electrostatic protection unit 32 along the second direction D2 may be reduced, such that the width e22 of the second electrostatic protection unit 32 along the second direction D2 is smaller than the width e21 of the first electrostatic protection unit 31 along the second direction D2. This configuration reduces the space occupied by the second electrostatic protection unit 32 along the second direction D2, thereby facilitating the optimal arrangement of the electrostatic protection unit 30 and contributing to the realization of a borderless or ultra-narrow bezel design for the display panel 100.

According to some embodiments of the present disclosure, the electrostatic protection unit 30 is arranged in a non-edge region of the display region AA. For example, referring to FIG. 11, the second electrostatic protection unit 32 is arranged between adjacent pixel driving circuits 40 along the first direction D1, while the first electrostatic protection unit 31 is arranged adjacent to the shift register 11 along the first direction D1. Considering that the lateral space (extending along the second direction D2) between adjacent pixel driving circuits 40 along the first direction D1 is relatively ample, while the longitudinal space (extending along the first direction D1) is limited, the width e22 of the second electrostatic protection unit 32 along the second direction D2 may be set to be greater than the width e21 of the first electrostatic protection unit 31 along the second direction D2, thereby meeting the spatial arrangement requirements for the electrostatic protection units in different regions.

Figure 13:
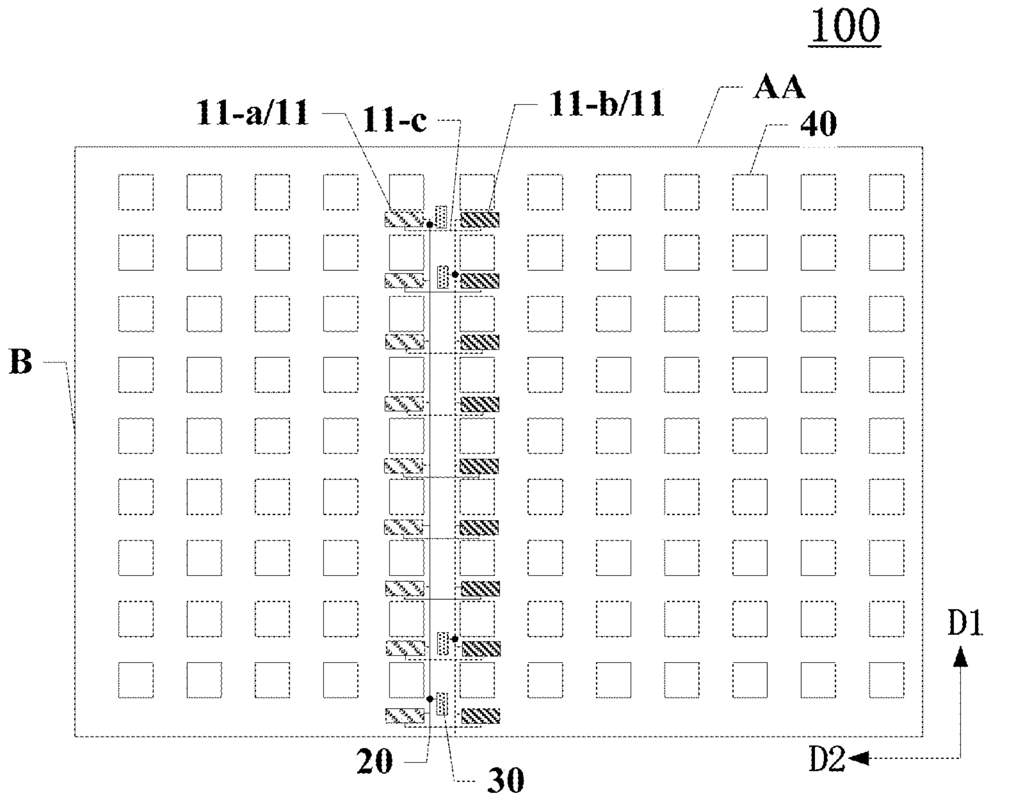
FIG. 13 illustrates yet another planar structural schematic diagram of a display panel in accordance with some embodiments of the present disclosure.

FIG. 13 illustrates another planar structural schematic diagram of a display panel according to some embodiments of the present disclosure. Referring to FIG. 13, as disclosed, the shift register 11 include a first module 11-*a* and a second module 11-*b*, which are arranged along the second direction D2. The first module 11-*a* and the second module 11-*b* are electrically connected through at least one first routing trace 11-*c*, and at least some of the electrostatic protection units 30 are arranged between the first module 11-*a* and the second module 11-*b*. The second direction D2 intersects with the first direction D1 and is parallel to the light-emitting surface of the display panel 100. In the shift register 11, the first module 11-*a* is a latch module, and the second module 11-*b* is a buffer module. In some other embodiments of the present disclosure, the shift register 11 may further include a logic module arranged between the latch module and the buffer module. The present disclosure does not impose specific limitations in this regard. The specific structure of these modules included in the shift register 11 may be referenced from related technologies, and the present disclosure does not impose limitations on this aspect.

When the shift registers are divided into the first module 11-*a* and the second module 11-*b*, which are connected via the first routing trace 11-*c*, a certain amount of space exists between the first module 11-*a* and the second module 11-*b*.

To facilitate the connection between the first signal line and both the first module 11-*a* and the second module 11-*b* of the shift register 11, the first signal line 20 may be arranged in the region between the first module 11-*a* and the second module 11-*b*. As disclosed, the electrostatic protection unit 30 is arranged in the region between the first module 11-*a* and the second module 11-*b*. By doing so, the electrostatic protection unit 30 is positioned closer to the first signal line 20, which helps reduce unnecessary wiring when connecting the electrostatic protection unit 30 to the first signal line 20. This configuration improves the electrostatic discharge protection capability of the display panel 100 while simplifying the overall routing structure of the display panel.

It should be noted that the intermediate component connecting the first module 11-*a* and the second module 11-*b* is not limited to the first routing trace 11-*c* but may also include other structures such as bridges or vias. The present disclosure provides the first routing trace 11-*c* merely as an illustrative example and is not limited to this configuration.

Referring to FIG. 1, in some embodiments of the present disclosure, the first signal line 20 includes a first sub-signal line 21 and a second sub-signal line 22, and the electrostatic protection unit 30 includes a first electrostatic protection unit 31 and a second electrostatic protection unit 32. The first electrostatic protection unit 31 is electrically connected to the first sub-signal line 21, while the second electrostatic protection unit 32 is electrically connected to the second sub-signal line 22. Along the second direction D2, the first electrostatic protection unit 31 and the second electrostatic protection unit 32 are positioned on the same side of the first sub-signal line 21 and the second sub-signal line 22. Additionally, along the second direction D2, the distance L1 between the first electrostatic protection unit 31 and the first sub-signal line 21 is less than or equal to the distance L2 between the second electrostatic protection unit 32 and the first sub-signal line 21.

Specifically, the first signal line 20 is a routing trace that is connected to the scan circuit 10 and provides signals to the scan circuit 10. The first signal line 20 includes a first sub-signal line 21 and a second sub-signal line 22. It should be noted that the first sub-signal line 21 and the second sub-signal line 22 extend substantially along the first direction D1, and the signals transmitted by the first sub-signal line 21 and the second sub-signal line 22 may be the same or different. The first sub-signal line 21 and the second sub-signal line 22 are both connected to the electrostatic protection unit 30, with the first electrostatic protection unit 31 being connected to the first sub-signal line 21, and the second electrostatic protection unit 32 being connected to the second sub-signal line 22. In the present disclosure, the first electrostatic protection unit 31 and the second electrostatic protection unit 32 are positioned on the same side of the first sub-signal line 21 and the second sub-signal line 22. Additionally, the distance L1 between the first electrostatic protection unit 31 and the first sub-signal line 21 is set to be less than or equal to the distance L2 between the second electrostatic protection unit 32 and the first sub-signal line 21. In other words, along the second direction D2, no additional electrostatic protection units 30 are positioned between the first sub-signal line 21 and the first electrostatic protection unit 31, and no additional electrostatic protection units 30 are positioned between the second sub-signal line 22 and the second electrostatic protection unit 32. By arranging the electrostatic protection unit 30 and the first signal line 20 in close proximity, the connection traces between the electrostatic protection unit 30 and the first signal line 20 are shortened. This configuration simplifies the routing structure, reduces the electrostatic conduction distance, enhances the electrostatic discharge capability, and further improves the overall electrostatic resistance of the display panel 100.

Figure 14:
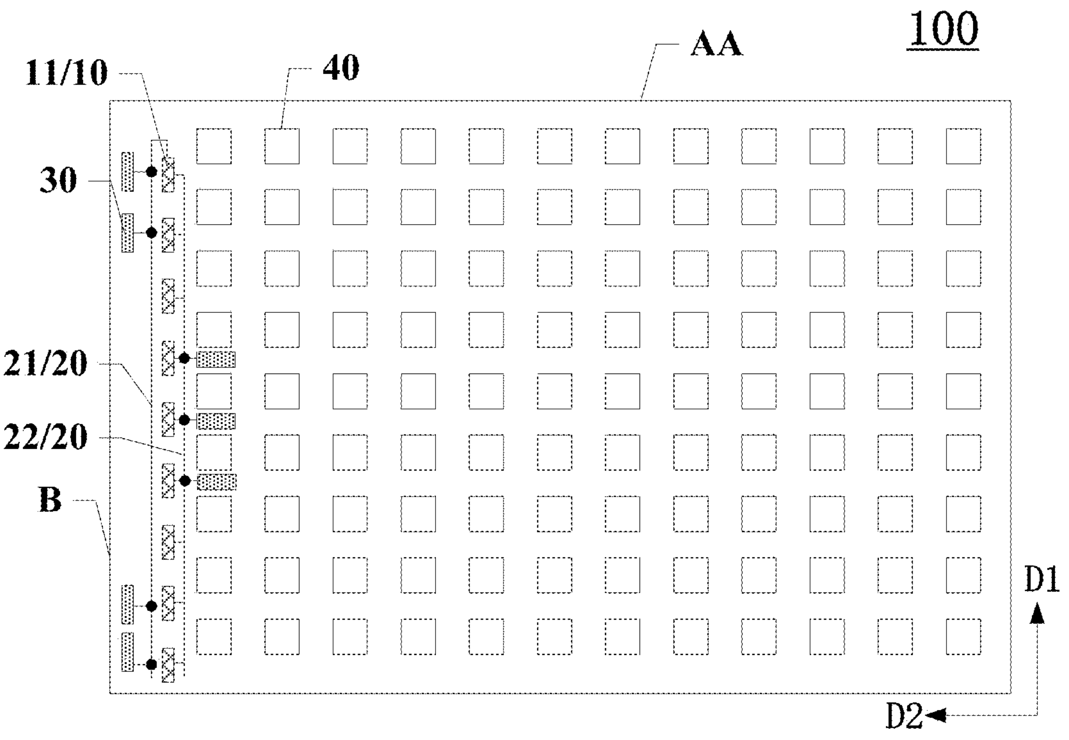
FIG. 14 illustrates yet another planar structural schematic diagram of a display panel in accordance with some embodiments of the present disclosure.

FIG. 14 illustrates another planar structural schematic diagram of a display panel according to some embodiments of the present disclosure. Referring to FIG. 14, in some embodiments of the present disclosure, the first signal line 20 includes a first sub-signal line 21 and a second sub-signal line 22. Along the second direction D2, the first sub-signal line 21 is positioned on a first side of the shift register 11, and the second sub-signal line 22 is positioned on a second side of the shift register 11, where the second direction D2 intersects with the first direction D1. The electrostatic protection unit 30 connected to the first sub-signal line 21 is arranged on the first side of the shift register 11, and the electrostatic protection unit 30 connected to the second sub-signal line 22 is arranged on the second side of the shift register 11.

It should be noted that in FIG. 13, the shift register 11 and the electrostatic protection unit 30 are adjacent to the edge of the display panel extending along the first direction D1. However, this is merely an example and should not be construed as limiting. The present embodiment is also applicable to configurations where the shift register 11 and the electrostatic protection unit 30 are not adjacent to the edge of the display panel extending along the first direction D1.

Specifically, as disclosed herein, the first signal line 20 includes the first sub-signal line 21 and the second sub-signal line 22, both of which are routing traces that provide signals to the scan circuit 10. The signals transmitted by the first sub-signal line 21 and the second sub-signal line 22 may be the same or different. The first sub-signal line 21 and the second sub-signal line 22 are positioned on opposite sides of the shift register 11 along the second direction D2. More specifically, the first sub-signal line 21 is positioned on the first side of the shift register 11 along the second direction D2, while the second sub-signal line 22 is positioned on the second side of the shift register 11 along the second direction D2, where the first side and the second side are opposite sides of the shift register 11 along the second direction D2. In other words, along the second direction D2, the shift register 11 is positioned between the first sub-signal line 21 and the second sub-signal line 22. As disclosed herein, the electrostatic protection unit 30 connected to the first sub-signal line 21 is arranged on the first side of the shift register 11, and the electrostatic protection unit 30 connected to the second sub-signal line 22 is arranged on the second side of the shift register 11. That is, both the first sub-signal line 21 and the electrostatic protection unit 30 connected to the first sub-signal line 21 are arranged on the first side of the shift register 11, while both the second sub-signal line 22 and the electrostatic protection unit 30 connected to the second sub-signal line 22 are arranged on the second side of the shift register 11. This configuration ensures that the first sub-signal line 21 is in close proximity to its corresponding electrostatic protection unit 30 connected to the first sub-signal line 21, and the second sub-signal line 22 is in close proximity to its corresponding electrostatic protection unit 30 connected to the first sub-signal line 22. As a result, the connection traces between the electrostatic protection unit 30 and the first signal line 20 are shortened, simplifying the overall routing structure of the display panel 100. Additionally, reducing the electrostatic conduction distance enhances electrostatic discharge performance, further improving the electrostatic resistance of the display panel 100.

It should be noted that, in the above embodiment, the electrostatic protection unit 30 connected to the first sub-signal line 21 is arranged on the side of the first sub-signal line 21 that is farther from the second sub-signal line 22, and the electrostatic protection unit 30 connected to the second sub-signal line 22 is arranged on the side of the second sub-signal line 22 that is farther from the first sub-signal line 21. The present disclosure provides this configuration merely as an example and should not be construed as limiting.

Referring to FIG. 1, in some embodiments of the present disclosure, at least two electrostatic protection units 30 are arranged on the same side of the same first signal line 20 along the second direction D2, where the second direction D2 intersects with the first direction D1. Along the second direction D2, at least two electrostatic protection units 30 positioned on the same side of the same first signal line 20 are respectively connected to different first signal lines 20.

Specifically, along the second direction D2, at least two electrostatic protection units 30 are arranged on the same side of the first signal line 20, with each of the at least two electrostatic protection units 30 being connected to a different first signal line 20. As disclosed herein, two electrostatic protection units 30 arranged on the same side of the first signal line 20 are respectively connected to different first signal lines 20, thereby providing electrostatic protection units 30 for different first signal lines 20. The electrostatic protection units 30 are electrically connected to the first signal lines 20, so that when the display panel 100 is subjected to electrostatic discharge, the electrostatic charge acting on different first signal lines 20 may be discharged through the electrostatic protection units 30. This configuration further prevents interference with the normal operation of the scan circuit 10, thereby avoiding disruption of the normal display of the display panel 100. As a result, the overall electrostatic resistance of the display product is improved.

Figure 15:
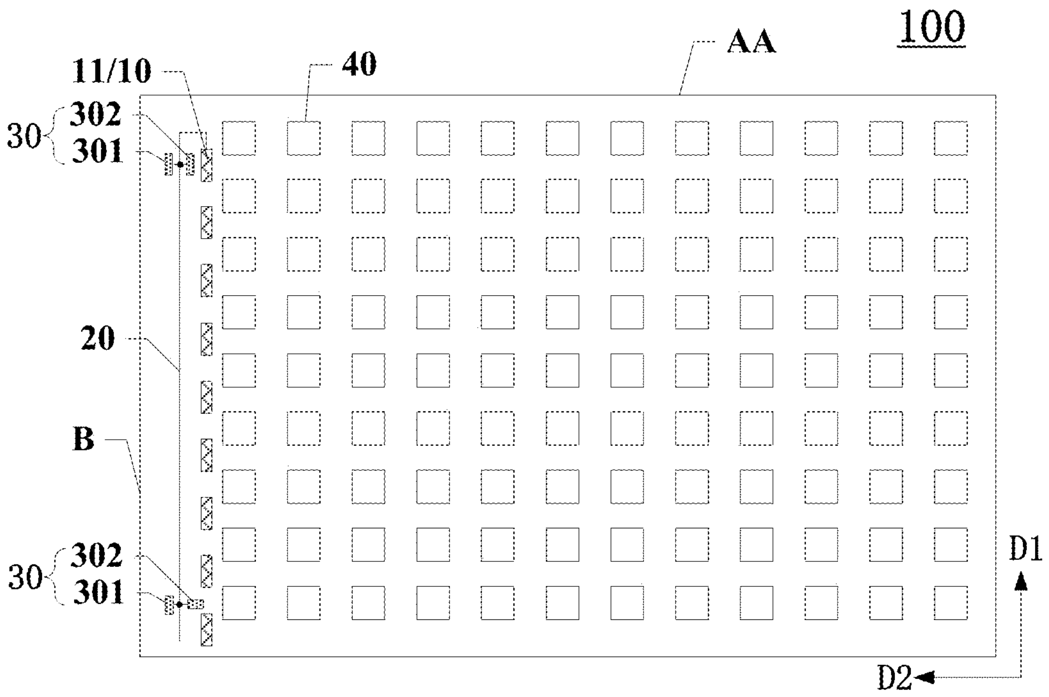
FIG. 15 illustrates yet another planar structural schematic diagram of a display panel in accordance with some embodiments of the present disclosure.

FIG. 15 illustrates another planar structural schematic diagram of a display panel according to some embodiments of the present disclosure. Referring to FIG. 15, in some embodiments of the present disclosure, at least some of the electrostatic protection units 30 include a first unit 301 and a second unit 302, and the first unit 301 and the second unit 302 are electrically connected to each other. The first unit 301 and the second unit 302 are respectively arranged on opposite sides of the first signal line 20 along the second direction D2, where the second direction D2 intersects with the first direction D1 and is parallel to the light-emitting surface of the display panel 100.

Specifically, the electrostatic protection unit 30 includes the first unit 301 and the second unit 302, where the first unit 301 and the second unit 302 are electrically connected to each other. As disclosed herein, the first unit 301 and the second unit 302 are respectively arranged on opposite sides of the first signal line 20 along the second direction D2. That is, the orthogonal projection of the electrostatic protection unit 30 on the display panel 100 overlaps with the orthogonal projection of the first signal line 20 on the display panel 100. This configuration further shortens the distance between the electrostatic protection unit 30 and the first signal line 20, thereby improving the electrostatic discharge capability of the electrostatic protection unit 30, preventing interference with the normal display of the display panel 100, and enhancing the overall electrostatic resistance of the display product.

It should be noted that the electrostatic protection unit 30 may be arranged on at least one side of the shift register 11 along the second direction D2, or on at least one side of the shift register 11 along the first direction D1. When the electrostatic protection unit 30 is arranged on at least one side of the shift register 11 along the second direction D2, the first unit 301 and the second unit 302 of the electrostatic protection unit 30 have more available space along the first direction D1. Therefore, the width of the first unit 301 and the second unit 302 along the first direction D1 may be increased, while the width of the first unit 301 and the second unit 302 along the second direction D2 may be reduced. This configuration reduces the space occupied along the second direction D2, facilitating the realization of a borderless or ultra-narrow bezel design for the display panel 100. When the electrostatic protection unit 30 is arranged on at least one side of the shift register 11 along the first direction D1, the first unit 301 of the electrostatic protection unit 30 has more available space along the first direction D1, while the second unit 302 has more available space along the second direction D2. Therefore, the width of the first unit 301 along the first direction D1 may be configured to be greater than the width of the second unit 302 along the first direction D1, and the width of the first unit 301 along the second direction D2 may be configured to be smaller than the width of the second unit 302 along the second direction D2, thereby enabling an optimized arrangement of the electrostatic protection unit 30.

Figure 16:
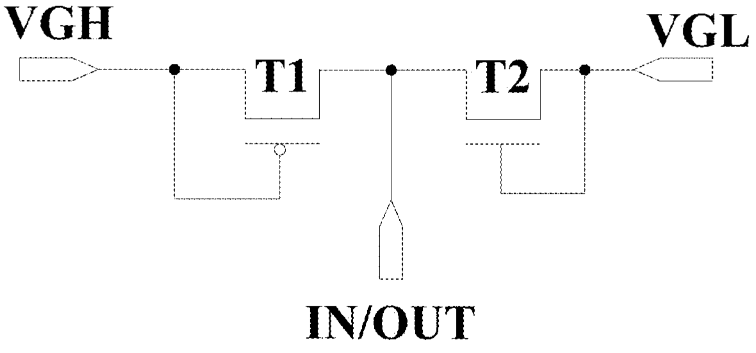
FIG. 16 illustrates a structural circuit diagram of an electrostatic protection unit in accordance with some embodiments of the present disclosure.

The circuit structure of the electrostatic protection unit 30 is described below. FIG. 16 illustrates a circuit structure diagram of an electrostatic protection unit according to some embodiments of the present disclosure. Referring to FIG. 16, in some embodiments of the present disclosure, the electrostatic protection unit 30 includes a first transistor T1 and a second transistor T2, where the first transistor T1 is a P-type transistor, and the second transistor T2 is an N-type transistor. The gate and the first electrode of the first transistor T1 are both connected to a high-level signal line VGH, and the second electrode of the first transistor T1 is connected to the input/output terminal IN/OUT. The gate and the first electrode of the second transistor T2 are both connected to a low-level signal line VGL, and the second electrode of the second transistor T2 is connected to the input/output terminal IN/OUT. Since the first transistor T1 is a P-type transistor, and its gate is connected to the high-level signal line VGH, when the second electrode of the first transistor T1 is floating, the first transistor T1 remains off. When the input/output terminal IN/OUT captures high-level electrostatic discharge, the potential of the second electrode of the first transistor T1 becomes significantly higher than the potential of its gate, causing the first transistor T1 to turn on, thereby discharging the electrostatic charge to the high-level signal line VGH. Similarly, the second transistor T2 is an N-type transistor, and its gate is connected to the low-level signal line VGL. When the second electrode of the second transistor T2 is floating, the second transistor T2 remains off. When the input/output terminal IN/OUT captures low-level electrostatic discharge, the potential of the second electrode of the second transistor T2 becomes significantly lower than the potential of its gate, causing the second transistor T2 to turn on, thereby discharging the electrostatic charge to the low-level signal line VGL. It should be noted that the above-described circuit structure of the electrostatic protection unit 30 includes only two transistors, occupying a relatively small area, which is beneficial for reducing the space occupied by the electrostatic protection unit 30.

Figure 17:
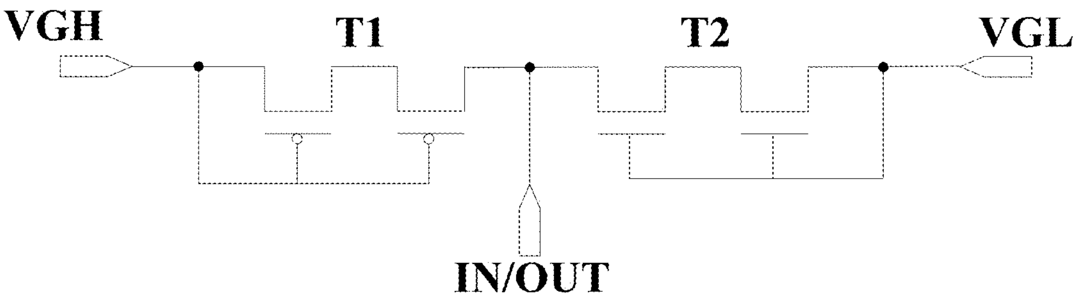
FIG. 17 illustrates another structural circuit diagram of an electrostatic protection unit in accordance with some embodiments of the present disclosure.

With respect to the electrostatic protection unit 30 described above, FIG. 17 illustrates another structural circuit diagram of an electrostatic protection unit according to some embodiments of the present disclosure. Referring to FIG. 17, in some embodiments of the present disclosure, the first transistor T1 and the second transistor T2 are dual-gate transistors. The use of dual-gate transistors improves the stability of the first transistor T1 and the second transistor T2, while also reducing leakage current, thereby lowering the power consumption of the electrostatic protection unit 30. The electrostatic discharge mechanism in this embodiment is the same as that of the electrostatic protection unit 30 described with reference to FIG. 16, and therefore, a detailed description is omitted here.

Figure 18:
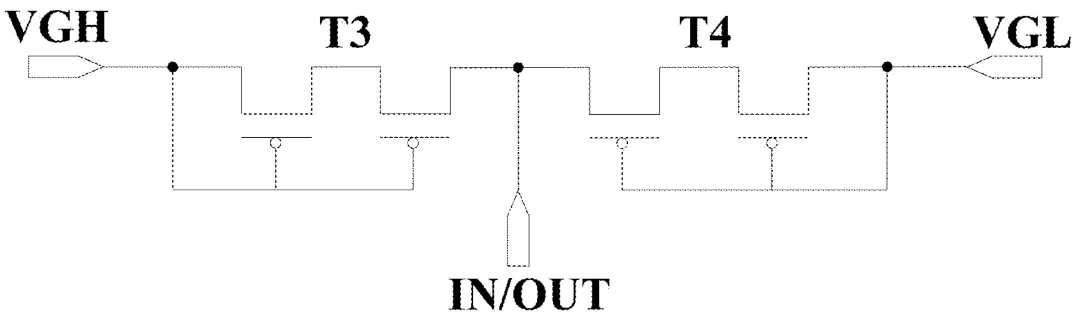
FIG. 18 illustrates yet another structural circuit diagram of an electrostatic protection unit in accordance with some embodiments of the present disclosure.

FIG. 18 illustrates yet another structural circuit diagram of an electrostatic protection unit according to some embodiments of the present disclosure. Referring to FIG. 18, in some embodiments of the present disclosure, the electrostatic protection unit 30 includes a third transistor T3 and a fourth transistor T4, and the third transistor T3 and the fourth transistor T4 are both P-type transistors. Additionally, the third transistor T3 and the fourth transistor T4 are both dual-gate transistors. When the input/output terminal IN/OUT captures high-level electrostatic discharge, the gate potential of the third transistor T3 becomes significantly lower than the potential of its second electrode, causing the third transistor T3 to turn on, thereby discharging the high-level electrostatic charge to the high-level signal line VGH. Similarly, when the input/output terminal IN/OUT captures low-level electrostatic discharge, the gate potential of the fourth transistor T4 becomes lower than the first low-level signal, causing the fourth transistor T4 to turn on, thereby discharging the low-level electrostatic charge to the first low-level signal line. It should be noted that the present disclosure describes the structure and principles of the electrostatic protection unit 30 using the above embodiments as examples. However, these embodiments should not be construed as limiting, and modifications may be made without departing from the scope of the present disclosure.

Please refer to FIG. 1. According to some embodiments of the present disclosure, the first signal line 20 includes a first-type signal line 201 and a second-type signal line 202. The first-type signal line 201 receives a fixed potential signal, and the second-type signal line 202 receives a non-fixed potential signal. The number of electrostatic protection units 30 connected to at least one first-type signal line 201 is n1, and the number of electrostatic protection units 30 connected to at least one second-type signal line 202 is n2, where n1<n2. The fixed potential signal referenced in the present embodiment may be, for example, a positive power supply voltage signal or a negative power supply voltage signal. The non-fixed potential signal may be, for example, a clock signal, a startup trigger signal, etc. The present disclosure is not specifically limited in this regard.

Specifically, the first signal line 20 is configured to provide signals to the scan circuit 10. The scan circuit 10 requires both fixed potential signals and non-fixed potential signals. The first-type signal line 201 transmits fixed potential signals to the scan circuit 10, and the second-type signal line 202 transmits non-fixed potential signals to the scan circuit 10. For the first-type signal line 201 that transmits fixed potential signals, since the signal itself is at a fixed potential, the impact of electrostatic discharge on the first-type signal line 201 is relatively small. In contrast, for the second-type signal line 202 that transmits non-fixed potential signals, when the display panel 100 is subjected to electrostatic discharge, the non-fixed potential signal is more susceptible to fluctuations, thereby making the second-type signal line 202 more vulnerable to electrostatic discharge effects. Therefore, as disclosed herein, the number n1 of electrostatic protection units 30 connected to the first-type signal line 201 is less than the number n2 of electrostatic protection units 30 connected to the second-type signal line 202. In this manner, the electrostatic protection units 30 are allocated based on actual needs. Fewer electrostatic protection units 30 are provided for the first-type signal line 201, which is less affected by electrostatic discharge; and more electrostatic protection units 30 are provided for the second-type signal line 202, which is more susceptible to electrostatic discharge. This arrangement optimizes the allocation of electrostatic protection units 30, allowing effective discharge of electrostatic energy acting on the first signal line 20 to prevent interference with the normal operation of the scan circuit 10. At the same time, this arrangement reduces the number of electrostatic protection units 30, thereby simplifying the structure of the display panel 100.

Furthermore, according to some embodiments of the present disclosure, n1=0. In other words, for the first-type signal line 201 that transmits fixed potential signals to the scan circuit 10, electrostatic protection units 30 may be omitted. This further reduces the number of electrostatic protection units 30, simplifying the structure of the display panel 100.

Please refer to FIG. 1 and FIG. 2. According to some embodiments of the present disclosure, the display region AA includes a first region AA1 and a second region AA2, where the second region AA2 is located on at least one side of the first region AA1 along the second direction D2. The second direction D2 intersects the first direction D1 and is parallel to the light-emitting surface of the display panel 100. The display panel 100 further includes an array of pixel driving circuits 40 and light-emitting elements LD connected to the pixel driving circuits 40. The pixel driving circuits 40 are located in the first region AA1, and the light-emitting elements LD are located in both the first region AA1 and the second region AA2. The scan circuit 10 and the electrostatic protection units 30 are located in the second region AA2. It should be noted that, for the sake of clear illustration, FIG. 1 does not show the light-emitting elements LD. The light-emitting elements LD are connected to the pixel driving circuits 40, and the connection structure may be referred to in FIG. 2. The light-emitting elements LD may be uniformly arranged in the first region AA1 and the second region AA2 of the display panel.

Specifically, as disclosed herein, the first region AA1 and the second region AA2 are arranged along the second direction D2, and the second region AA2 is located at the edge area of the display region AA. The light-emitting elements LD are uniformly distributed throughout the display region AA, and both the first region AA1 and the second region AA2 contain light-emitting elements LD. The pixel driving circuits 40 are uniformly arranged in the first region AA1, and at least some of the light-emitting elements LD located in the second region AA2 are connected to the corresponding pixel driving circuits 40 via flying wires. In the present disclosure, arranging the pixel driving circuits 40 in an array within the first region AA1 provides efficient utilization of space within the display panel 100. This arrangement reserves additional space for other circuit components and routing structures within the display panel 100. Additionally, placing the pixel driving circuits 40 closer to the central area of the display panel 100 minimizes the risk of damage during cutting and fabrication processes. Moreover, as disclosed, the scan circuit 10 and the electrostatic protection units 30 are concentrated in the second region AA2, rather than occupying space within the first region AA1, where the pixel driving circuits 40 are located. This arrangement reduces the overlap of conductive layers between different circuits, thereby minimizing parasitic capacitance effects and reducing unwanted interference between different circuits in the display panel 100. Furthermore, the layout of the pixel driving circuits 40 is not affected by the scan circuit 10 and electrostatic protection units 30, preventing an increase in manufacturing complexity due to the inclusion of the scan circuit 10 and electrostatic protection units 30.

Referring to FIG. 9, the present disclosure provides a configuration in which the electrostatic protection unit 30 and the shift register 11 are centrally arranged in the second region AA2. Regarding the relative positions of the electrostatic protection unit 30 and the shift register 11, according to some embodiments of the present disclosure, in the second region AA2, along the second direction D2, the electrostatic protection unit 30 is positioned on the side of the shift register 11 that is farther from the first region AA1; and/or, along the first direction D1, the electrostatic protection unit 30 is positioned on at least one side of the shift register 11. Specifically, the electrostatic protection unit 30 and the shift register 11 are both positioned in the second region AA2. The electrostatic protection unit 30 may be entirely positioned on one side of the shift register 11 along the second direction D2; entirely positioned on one side of the shift register 11 along the first direction D1; or, partially positioned on one side of the shift register 11 along the second direction D2, and partially positioned on one side of the shift register 11 along the first direction D1. It should be noted that when the electrostatic protection unit 30 is positioned on one side of the shift register 11 along the second direction D2, it does not occupy space in the first direction D1 that is allocated for arranging the shift register 11, thereby reducing the impact on the spatial layout of the shift register 11. When the electrostatic protection unit 30 is positioned on one side of the shift register 11 along the first direction D1, it helps reduce the space occupied by the electrostatic protection unit 30 along the second direction D2, thereby facilitating the implementation of a borderless or ultra-narrow bezel design for the display panel 100. Furthermore, when multiple borderless display panels 100 are tiled together to form a large display panel, this configuration helps reduce visible seams between adjacent panels, thereby enhancing the display quality of the large-sized display panel 100.

Please refer to FIG. 1. According to some embodiments of the present disclosure, the first signal line 20 includes a first sub-signal line 21 and a second sub-signal line 22. In the second region AA2, along the second direction D2, the first sub-signal line 21 is positioned between the second sub-signal line 22 and the edge B of the display panel 100, the first sub-signal line 21 receives a non-fixed potential signal. The number of electrostatic protection units 30 connected to one first sub-signal line 21 is n01, and the number of electrostatic protection units 30 connected to one second sub-signal line 22 is n02, where n01>n02.

Specifically, in the display panel 100, the first signal line 20 is electrically connected to the scan circuit 10 and provides signals for the scan circuit 10. These signals include both non-fixed potential signals and fixed potential signals, where the first sub-signal line 21 receives a non-fixed potential signal. The fixed potential signal referenced may be, for example, a positive power supply voltage signal or a negative power supply voltage signal. The non-fixed potential signal may be, for example, a clock signal, a startup trigger signal, etc. The present disclosure is not specifically limited in this regard. The first sub-signal line 21 is positioned on the side of the second sub-signal line 22 that is farther from the first region AA1, meaning that the first sub-signal line 21 is closer to the edge of the display panel 100. When the display panel 100 is subjected to electrostatic discharge, the first sub-signal line 21, being closer to edge B, is more susceptible to electrostatic effects. Therefore, as disclosed, the number n01 of electrostatic protection units 30 connected to one first sub-signal line 21 is greater than the number n02 of electrostatic protection units 30 connected to one second sub-signal line 22, i.e., n01>n02. More electrostatic protection units 30 are allocated to the first sub-signal line 21, which is more prone to electrostatic interference, thereby enhancing electrostatic discharge capability and preventing disruptions in the scan circuit 10. This configuration ultimately prevents electrostatic interference from affecting the normal display of the display panel 100, thereby enhancing the overall electrostatic resistance of the display product. It should be noted that the embodiment shown in FIG. 1 is provided merely as an example, where n01=4 and n02=2. However, this should not be construed as a limitation on the scope of the present disclosure.

Please continue referring to FIG. 1. Regarding the types of the second sub-signal line 22, according to some embodiments of the present disclosure, the second sub-signal line 22 includes fixed-potential signal lines and non-fixed-potential signal lines. The number of electrostatic protection units 30 connected to a fixed-potential signal line is less than the number of electrostatic protection units 30 connected to a non-fixed-potential signal line. Specifically, the first sub-signal line 21 includes fixed-potential signal lines, which receive fixed-potential signals, and non-fixed-potential signal lines, which receive non-fixed-potential signals. Regarding the non-fixed-potential signal lines, during signal transmission, the signals received by the non-fixed-potential signal lines may undergo transitions. When the display panel 100 is subjected to electrostatic discharge, the non-fixed-potential signal lines are more significantly affected by electrostatic interference. Therefore, as disclosed herein, the number of electrostatic protection units 30 connected to a fixed-potential signal line is less than the number of electrostatic protection units 30 connected to a non-fixed-potential signal line. This configuration facilitates the discharge of electrostatic charges from the non-fixed-potential signal lines, thereby preventing disruptions to the normal operation of the scan circuit 10 and ensuring the normal display of the display panel 100. Accordingly, this arrangement contributes to enhancing the overall electrostatic resistance of the display product.

Regarding the fixed-potential signal lines, the signals they receive are fixed-potential signals. When the display panel 100 is subjected to electrostatic discharge, the fixed-potential signal lines are either minimally affected by electrostatic interference or nearly unaffected. Therefore, according to some embodiments of the present disclosure, the number of electrostatic protection units 30 connected to a fixed-potential signal line is zero, meaning that some fixed-potential signal lines are not connected to any electrostatic protection units 30. This configuration reduces the number of electrostatic protection units 30, thereby simplifying the overall structure of the display panel 100.

Please continue referring to FIG. 1 and FIG. 5. The following describes the types of first signal lines 20 included in the display panel 100. The first signal line 20 includes a first sub-signal line 21 and a second sub-signal line 22, where the first sub-signal line 21 receives a non-fixed-potential signal. According to some embodiments of the present disclosure, the first sub-signal line 21 is a start trigger signal line (STV). The start trigger signal line STV is configured to transmit a control signal to the first stage shift register 11 as an input signal to the first stage shift register 11. The second sub-signal line 22 includes at least one of a first power voltage signal line Vgh, a second power voltage signal line Vgl, a first clock signal line XCK, or a second clock signal line CK. The second sub-signal line 22 may further include other types of signal lines, such as control signal lines that provide control signals to the shift register 11 to determine whether the shift register 11 outputs an effective level of a scan signal. The control signal transmitted by the control signal line may be a ramp signal or another non-constant level signal.

Please refer to FIG. 9. According to some embodiments of the present disclosure, the electrostatic protection unit 30 connected to the first sub-signal line 21 is arranged on one side of the shift register 11 that is away from the first region AA1, and the electrostatic protection unit 30 connected to at least one second sub-signal line 22 is arranged on at least one side of the shift register 11 along the first direction D1.

Specifically, the first sub-signal line 21 is a start trigger signal line, which receives a start trigger signal. The first sub-signal line 21 is located between the second sub-signal line 22 and the edge B of the display panel 100, and is positioned closer to the edge B of the display panel 100. The start trigger signal received by the first sub-signal line 21 is a non-fixed-potential signal. When the display panel 100 is subjected to electrostatic discharge, the first sub-signal line 21 located at the edge is more susceptible to electrostatic interference, and the first sub-signal line 21 that receives a non-fixed-potential signal is also more vulnerable to electrostatic interference. Therefore, as disclosed, the electrostatic protection unit 30 connected to the first sub-signal line 21 is arranged on the side of the shift register 11 that is away from the first region AA1. The electrostatic protection unit 30 is positioned closer to the edge of the display panel 100, with a shorter distance to the first sub-signal line 21. In this way, electrostatic charges acting on the first sub-signal line 21 may be more effectively discharged, thereby preventing disruption to the normal operation of the scan circuit 10 and ensuring the normal display of the display panel 100. This configuration thus enhances the overall electrostatic resistance of the display product. Additionally, compared to the first sub-signal line 21, the second sub-signal line 22 is positioned closer to the shift register 11. Therefore, as disclosed herein, the electrostatic protection unit 30 connected to at least one second sub-signal line 22 is arranged on at least one side of the shift register 11 along the first direction D1. With this configuration, the distance between the second sub-signal line 22 and the electrostatic protection unit 30 connected to the second sub-signal line 22 is shorter, thereby facilitating electrostatic discharge from the second sub-signal line 22. As a result, this arrangement prevents interference with the normal operation of the scan circuit 10, ensuring that the normal display of the display panel 100 is not affected. Consequently, this configuration is beneficial for improving the overall electrostatic resistance of the display product.

It should be noted that the above-described embodiments provide a design concept in which the shift register 11 connected to the first signal line 20 is arranged at a position closer to the first signal line 20 to facilitate electrostatic discharge from the first signal line 20. However, the present disclosure is not limited thereto. It should also be noted that the number of electrostatic protection units 30 connected to the first signal line 20, as illustrated in the embodiments of the present disclosure, is for exemplary purposes only and is not to be considered as limiting.

Please refer to FIG. 1. According to some embodiments of the present disclosure, along the second direction D2, the electrostatic protection unit 30 connected to the first sub-signal line 21 and the electrostatic protection unit 30 connected to the second sub-signal line 22 are both located on the side of the shift register 11 that is away from the first region AA1. Additionally, along the first direction D1, the electrostatic protection unit 30 connected to the second sub-signal line 22 is located between the electrostatic protection units 30 connected to the first sub-signal line 21.

Specifically, the electrostatic protection units 30 connected to the first sub-signal line 21 and the electrostatic protection units 30 connected to the second sub-signal line 22 are both located within the second region AA2 and positioned on the side of the shift register 11 that is away from the first region AA1, i.e., the electrostatic protection units 30 are arranged closer to the edge B of the display panel 100. Since the first sub-signal line 21 is positioned near the edge B of the display panel 100, which extends along the first direction D1, it is more susceptible to electrostatic interference. For example, during the panel cutting process, electrostatic charges may accumulate at the edge extending along the first direction D1 and at the edge extending along the second direction D2 of the display panel 100. Therefore, as disclosed herein, among the electrostatic protection units 30 arranged along the first direction D1, the electrostatic protection units 30 connected to the first sub-signal line 21 are positioned on both sides of the edge of the display region AA extending along the second direction D2. The electrostatic protection unit 30 connected to the first sub-signal line 21 is positioned near the end portion of the first sub-signal line 21. When the display panel 100 is subjected to electrostatic discharge, this configuration facilitates electrostatic discharge through the electrostatic protection units 30, thereby preventing adverse effects on the display performance of the display panel 100 and avoiding damage to circuits within the display panel 100. Consequently, this arrangement enhances the overall electrostatic resistance of the display panel 100.

Optionally, the first sub-signal line 21 receives a non-fixed potential signal and is positioned near the edge of the display panel 100, making it more susceptible to electrostatic effects. Therefore, the electrostatic protection unit 30 connected to the first sub-signal line 21 is arranged on both sides along the first direction D1, near the edge of the display panel 100 and adjacent to the end portion of the first sub-signal line 21, facilitating electrostatic discharge. Compared to the first sub-signal line 21, the second sub-signal line 22 is relatively less affected by electrostatic effects. Accordingly, the electrostatic protection unit 30 connected to the second sub-signal line 22 is arranged between the electrostatic protection units 30 connected to the first sub-signal line 21.

Figure 19:
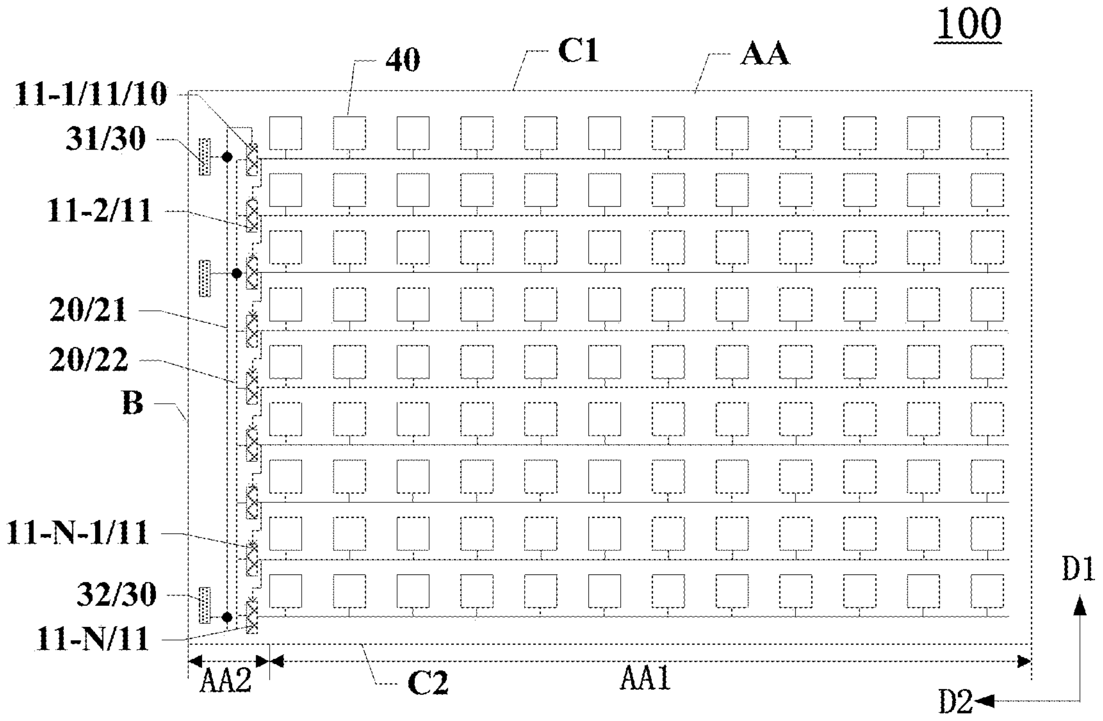
FIG. 19 illustrates yet another planar structural schematic diagram of a display panel in accordance with some embodiments of the present disclosure.

FIG. 19 illustrates yet another planar structural diagram of a display panel according to some embodiments of the present disclosure. Please refer to FIG. 19. According to some embodiments of the present disclosure, the scan circuit 10 includes N-stage shift registers 11, where N≥3. The display panel 100 includes a first edge C1 and a second edge C2, where the first edge C1 and the second edge C2 are oppositely arranged along the first direction D1. The first stage shift register 11-1 is adjacent to the first edge C1, while the Nth stage (i.e., the last stage) shift register 11-N is adjacent to the second edge C2. The electrostatic protection unit 30 connected to the first sub-signal line 21 includes a first electrostatic protection unit 31 and a second electrostatic protection unit 32. Along the first direction D1, the first electrostatic protection unit 31 is positioned closer to the first edge C1 than the second stage shift register 11-2. In other words, the first electrostatic protection unit 31 is closer to the first edge C1 relative to the second stage shift register 11-2. Similarly, the second electrostatic protection unit 32 is positioned closer to the second edge C2 than the (N−1)th stage shift register 11-N−1. That is, the second electrostatic protection unit 32 is positioned closer to the second edge C2 relative to the penultimate shift register 11-N−1.

Accordingly, the first electrostatic protection unit 31 and the second electrostatic protection unit 32 connected to the first sub-signal line 21 are respectively arranged at opposite end regions of the first sub-signal line 21 along the first direction D1. Considering that, during the production of the display panel, electrostatic effects are more likely to occur in the corner regions of the display panel during the cutting process, and given that the first sub-signal line 21 is positioned closest to the edge region of the display panel, electrostatic effects are more likely to impact the first signal line. Therefore, as disclosed, the two electrostatic protection units 30 connected to the first sub-signal line 21 are respectively arranged at positions near the corner regions of the display panel, adjacent to the opposite ends of the first sub-signal line 21. When the display panel 100 is subjected to electrostatic effects, this configuration facilitates the timely discharge of electrostatic charges through the electrostatic protection units 30 at both end regions of the first sub-signal line 21, preventing adverse effects on the display performance and circuitry of the display panel 100. Therefore, this configuration enhances the overall electrostatic protection capability of the display panel 100.

It should be noted that the first sub-signal line 21 receives a non-fixed potential signal and is positioned near the edge of the display panel 100, making it more susceptible to electrostatic effects. The first sub-signal line 21 may be a start-up trigger signal line. As disclosed herein, the two electrostatic protection units 30 are respectively connected to the end regions of the first sub-signal line 21, thereby facilitating electrostatic discharge.

Figure 20:
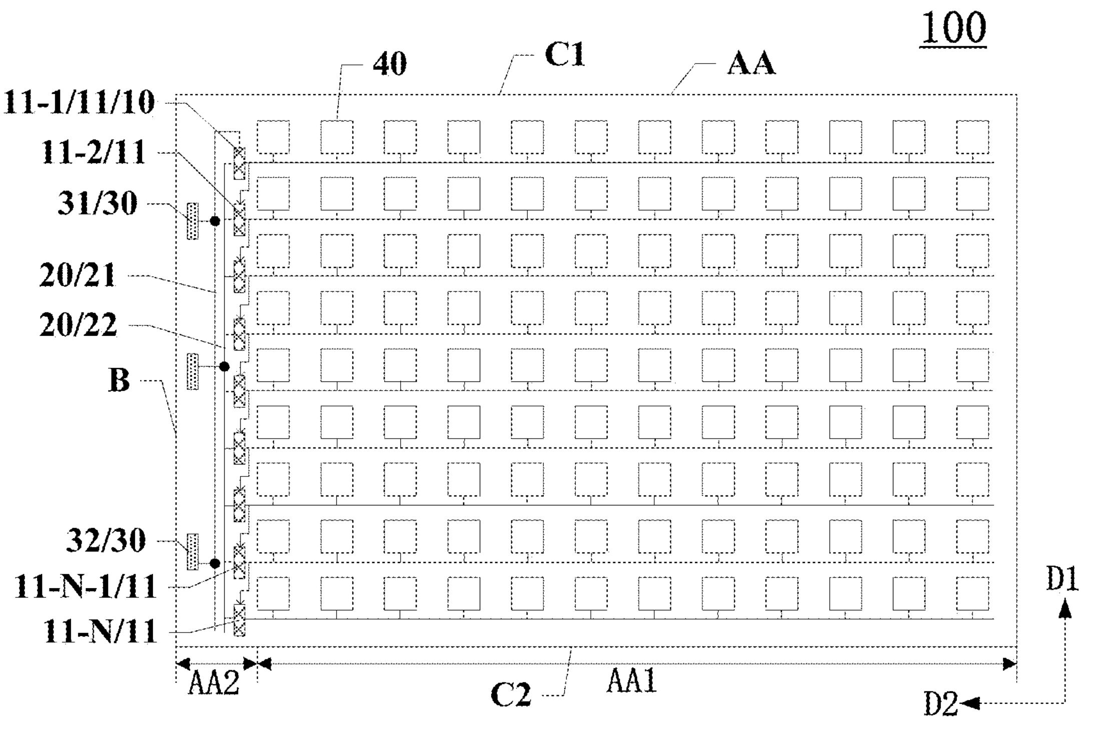
FIG. 20 illustrates yet another planar structural schematic diagram of a display panel in accordance with some embodiments of the present disclosure.

FIG. 20 illustrates yet another planar structural diagram of a display panel according to some embodiments of the present disclosure. Please refer to FIGS. 19 and 20. Furthermore, along the first direction D1 or the second direction D2, the first electrostatic protection unit 31 is adjacent to the first stage shift register 11-1 or the second stage shift register 11-2, and the second electrostatic protection unit 32 is adjacent to the Nth stage shift register 11-N or the (N−1)th stage shift register 11-N−1. Referring to FIG. 19, as disclosed, the first electrostatic protection unit 31 is positioned along the second direction D2, adjacent to the first stage shift register 11-1, and the second electrostatic protection unit 32 is positioned along the second direction D2, adjacent to the Nth stage shift register 11-N. Referring to FIG. 20, as disclosed, the first electrostatic protection unit 31 is positioned along the second direction D2, adjacent to the second stage shift register 11-2, and the second electrostatic protection unit 32 is positioned along the second direction D2, adjacent to the (N−1)th stage shift register 11-N−1. It should be noted that the present disclosure merely describes the above embodiments as examples and is not limited thereto. The above embodiments illustrate that the first electrostatic protection unit 31 connected to the first sub-signal line 21 and the second electrostatic protection unit 32 connected to the first sub-signal line 21, are positioned in regions proximate to the first edge C1 or the second edge C2. The electrostatic protection units 30 may be positioned adjacent to the shift register 11 along the first direction D1 or adjacent to the shift register 11 along the second direction D2.

In the embodiments shown in FIGS. 1, 9, 14, 15, 19, and 20, the scan circuit 10 and the electrostatic protection units 30 are positioned in the second region AA2, where the second region AA2 is proximate to the edge B of the display panel 100. The scan circuit 10 and the electrostatic protection units 30 are positioned in the second region AA2, and the pixel driving circuits 40 is positioned in the first region AA1. That is, the scan circuit 10 and the electrostatic protection units 30 are arranged in a separate region from the pixel driving circuits 40. This configuration improves the electrostatic discharge resistance of the display panel 100, while preventing occupation of the first region AA1, thereby reducing the influence of the scan circuit 10 and the electrostatic protection units 30 on the pixel driving circuits 40 in the first region AA1.

In some other embodiments of the present disclosure, the scan circuit 10, electrostatic protection units 30, and pixel driving circuits 40 may also be arranged in the same region. Please refer to FIGS. 10 and 11. In some embodiments of the present disclosure, the display region AA includes a first region AA1 and a second region AA2, where the second region AA2 is positioned along at least one side of the first region AA1 along the second direction D2. The second direction D2 intersects the first direction D1 and is parallel to the light-emitting surface of the display panel 100. The display panel 100 further includes a plurality of pixel driving circuits 40 arranged in an array and light-emitting elements LD connected to the pixel driving circuits 40. The pixel driving circuits 40 are located in the first region AA1, and the light-emitting elements LD are located in both the first region AA1 and the second region AA2. The scan circuit 10 and the electrostatic protection units 30 are positioned in the first region AA1. It should be noted that the drawings of the present disclosure are provided to clearly illustrate the spatial relationship among the scan circuit 10, electrostatic protection units 30, and pixel driving circuits 40 in the first region AA1. In FIGS. 10 and 11, only the light-emitting elements LD in the second region AA2 are shown, while the light-emitting elements LD in the first region AA1 are not illustrated. However, in practice, the light-emitting elements LD are included in both the first region AA1 and the second region AA2. The light-emitting elements positioned in the first region AA1 and the second region AA2 are evenly arranged.

As disclosed herein, the pixel driving circuits 40 are arranged in an array within the first region AA1, and the scan circuit 10 and electrostatic protection unit 30 are also arranged within the first region AA1. As a result, the scan circuit 10 and electrostatic protection unit 30 do not occupy space in the second region AA2, which facilitates the implementation of a borderless or ultra-narrow border design for the display panel 100.

Figure 21:
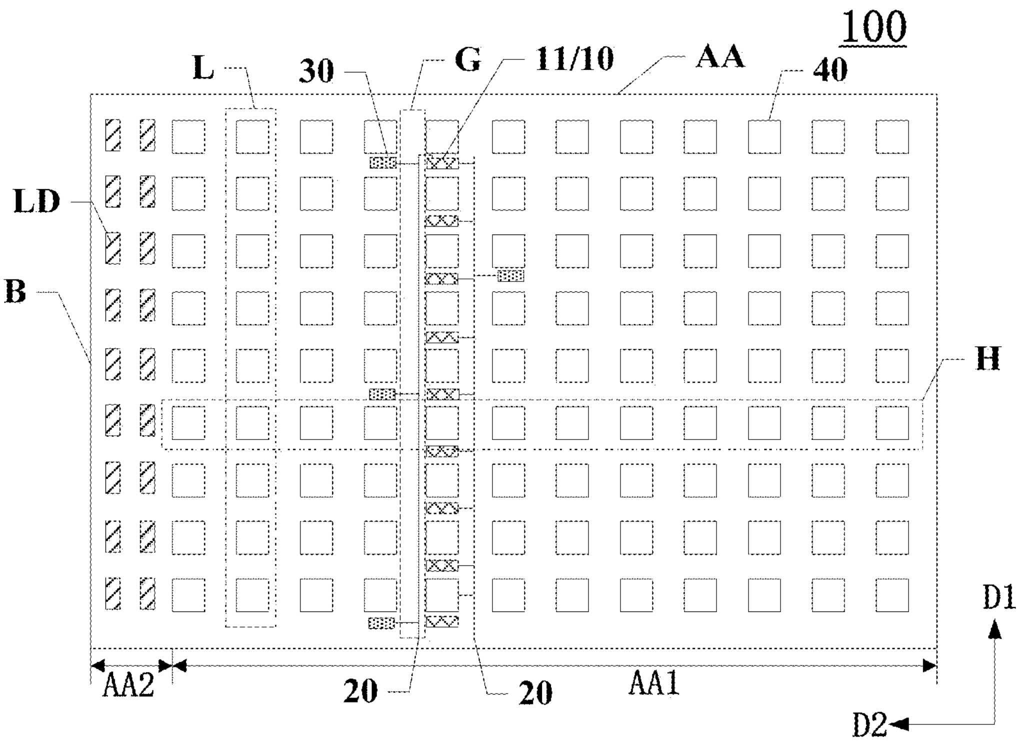
FIG. 21 illustrates yet another planar structural schematic diagram of a display panel in accordance with some embodiments of the present disclosure.

FIG. 21 illustrates another planar structural schematic diagram of a display panel according to some embodiments of the present disclosure. Referring to FIG. 21, the pixel driving circuits 40 arranged in an array include a plurality of pixel driving circuit rows H arranged along the first direction D1 and a plurality of pixel driving circuit columns L arranged along the second direction D2. Where adjacent pixel driving circuit columns L are spaced apart by a first gap G. The second direction D2 intersects the first direction D1. The shift register 11 and electrostatic protection unit 30 are arranged between different rows of pixel driving circuit 40. Along the first direction D1, at least part of the shift register 11 does not overlap with the first gap G, and/or at least part of the electrostatic protection unit 30 does not overlap with the first gap G.

When the scan circuit 10 and electrostatic protection unit 30 are arranged in the same region as the pixel driving circuit 40, it is necessary to reduce or avoid interference with the existing wiring in the first region AA1. Specifically, the first region AA1 includes a plurality of pixel driving circuit columns arranged along the second direction D2, and a first gap G is provided between adjacent pixel driving circuit columns. At least part of the first gap G is typically occupied by wiring extending along the first direction D1, such as data lines, first-type power voltage signal lines, and second-type power voltage signal lines. The data lines are configured to provide data signals to the pixel driving circuits 40. The pixel driving circuit 40 includes a pulse amplitude modulation circuit and a pulse width modulation circuit, where the pulse amplitude modulation circuit is configured to control the amplitude of the driving current based on the applied pulse amplitude modulation data, and the pulse width modulation circuit is configured to control the pulse width of the driving current. The first-type power voltage signal line is a power signal line electrically connected to the pulse width modulation circuit, and the second-type power voltage signal line is a power signal line electrically connected to the pulse amplitude modulation circuit.

To reduce the impact on the signals of the pixel driving circuits 40, one implementation is to minimize overlap with the first gap G. That is, it is necessary to reduce the overlap between the shift register 11, the electrostatic protection unit 30, and the first gap G. The present disclosure provides some embodiments in which at least part of the shift register 11 does not overlap with the first gap G. The present disclosure also provides some embodiments in which at least part of the electrostatic protection unit 30 does not overlap with the first gap G. Furthermore, the present disclosure provides yet some embodiment in which at least part of the shift register 11 does not overlap with the first gap G, and at least part of the electrostatic protection unit 30 does not overlap with the first gap G. By reducing the overlap between the shift register 11, the electrostatic protection unit 30, and the first gap G, the present disclosure minimizes the overlap between the shift register 11, the electrostatic protection unit 30, and the existing wiring of the pixel driving circuits 40 in the first region AA1, thereby reducing interference with the pixel driving circuits 40.

Please refer to FIGS. 10 and 11. According to some embodiments of the present disclosure, the pixel driving circuits 40 arranged in an array include a plurality of pixel driving circuit rows H arranged along the first direction D1 and a plurality of pixel driving circuit columns L arranged along the second direction D2, where adjacent pixel driving circuit columns L are spaced apart by a first gap G. The second direction D2 intersects the first direction D1. Along the first direction D1, the shift register 11 overlaps the first gap G, and/or the electrostatic protection unit 30 overlaps the first gap G.

Specifically, within the multiple pixel driving circuit rows H arranged along the first direction D1, there are multiple pixel driving circuits 40 arranged along the second direction D2, and wiring extending along the second direction D2 is provided between adjacent pixel driving circuit rows. Examples of such wiring include data write control signal lines, reset control signal lines, and light-emission control signal lines. The data write control signal line is configured to provide a control signal to the pixel driving circuit 40 to control the writing of data signals. The reset control signal line is configured to provide a control signal to the pixel driving circuit 40 to control the resetting of the pixel driving circuit. The light-emission control signal line is configured to provide a light-emission control signal to the pixel driving circuit to generate a drive signal for driving a light-emitting element to emit light.

When the shift register 11 or the electrostatic protection unit 30 is arranged in the spacing between adjacent pixel driving circuits 40 along the first direction D1, the shift register 11 or the electrostatic protection unit 30 overlaps with the original wiring between the pixel driving circuits 40, which may generate parasitic capacitance. Accordingly, in some embodiments of the present disclosure, the shift register 11 or the electrostatic protection unit 30 is arranged within the first gap G between pixel driving circuit columns. This arrangement helps reduce the overlap between the shift register 11 or the electrostatic protection unit 30 and the original wiring between the pixel driving circuit rows, thereby minimizing parasitic capacitance. The present disclosure provides an embodiment in which, along the first direction D1, the shift register 11 overlaps the first gap G. The present disclosure also provides another embodiment in which, along the first direction D1, the electrostatic protection unit 30 overlaps the first gap G.

Considering that at least part of the first gap G is occupied by signal lines connected to the pixel driving circuit 40, such as data lines and power signal lines, when the shift register 11 or the electrostatic protection unit 30 is arranged within the first gap G, the data lines or power signal lines may be relocated. Specifically, the data lines or power signal lines may be placed in a different first gap that originally lacked such wiring, or the shift register 11 and the electrostatic protection unit 30 may be arranged in a first gap that does not contain data lines or power signal lines. This configuration helps prevent the placement of the shift register 11 or the electrostatic protection unit 30 from interfering with the layout of the signal lines.

FIGS. 9 and 10 illustrate, according to some embodiments, the electrostatic protection unit 30 and the first signal line 20 connected to the electrostatic protection unit 30 are arranged in separate regions, with the pixel driving circuit 40 positioned between the electrostatic protection unit 30 and the first signal line 20. However, the present disclosure is not limited to this arrangement. In some embodiments of the present disclosure, the electrostatic protection unit 30 and the first signal line 20 connected to the electrostatic protection unit 30 may be arranged within the same gap, referring to FIG. 22.

Figure 22:
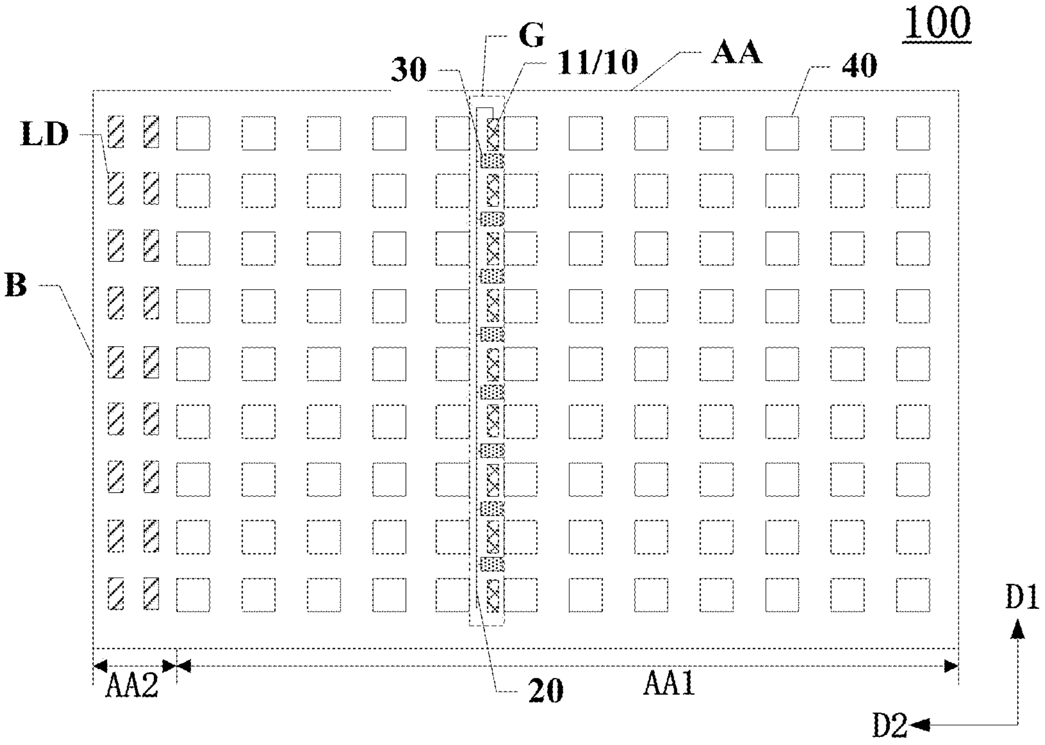
FIG. 22 illustrates yet another planar structural schematic diagram of a display panel in accordance with some embodiments of the present disclosure.

FIG. 22 illustrates another planar structural schematic diagram of a display panel according to some embodiments of the present disclosure. Please refer to FIG. 22. According to some embodiments of the present disclosure, along the first direction D1, the shift register 11 and the electrostatic protection unit 30 are arranged within the same first gap G. This configuration facilitates the close connection of the electrostatic protection unit 30 and the first signal line 20 connected to the electrostatic protection unit 30. In this case, the first gap G may be devoid of signal lines extending along the first direction D1 that are connected to the pixel driving circuit, thereby avoiding overlap between the shift register 11, the electrostatic protection unit 30, and the wiring of other first gaps between pixel driving circuit columns, ultimately reducing parasitic capacitance.

Figure 23:
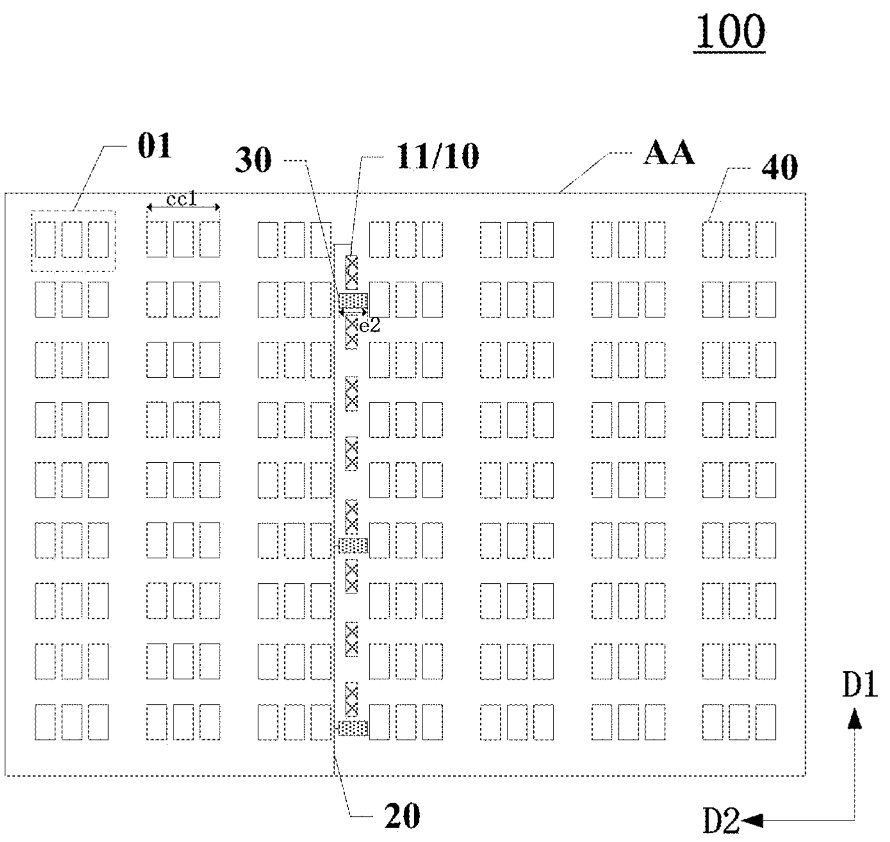
FIG. 23 illustrates yet another planar structural schematic diagram of a display panel in accordance with some embodiments of the present disclosure.

FIG. 23 illustrates another planar structural schematic diagram of a display panel according to some embodiments of the present disclosure. Please refer to FIG. 23. According to some embodiments of the present disclosure, the display panel 100 includes a plurality of circuit units 01 arranged in an array. The circuit unit 01 includes at least two pixel driving circuits 40 arranged along the second direction D2. As disclosed, a circuit unit 01 includes three pixel driving circuits 40 as an example; however, the present disclosure is not limited thereto. The light-emitting elements connected to the three pixel driving circuits 40 in a circuit unit 01 may respectively emit three different colors, such as red, green, and blue. Along the second direction D2, the width e2 of the electrostatic protection unit 30 is smaller than the width cel of the circuit unit 01, and at least part of the electrostatic protection unit 30 is arranged between adjacent circuit units 01. Along the first direction D1, at least part of the electrostatic protection unit 30 is arranged between adjacent shift registers 11.

When the width of the electrostatic protection unit 30 along the second direction D2 is smaller than the width of a single circuit unit 01 along the second direction D2, the spacing between adjacent circuit units 01 along the second direction D2 is generally greater than or equal to the width of the electrostatic protection unit along the second direction D2. Therefore, the electrostatic protection unit 30 may be arranged in the region between adjacent circuit units 01 along the second direction D2. In this case, the shift register 11 corresponding to the electrostatic protection unit 30 may be arranged in the same gap as the electrostatic protection unit 30, that is, in the spacing between two adjacent columns of circuit units 01. In this way, a proximal connection between the electrostatic protection unit 30 and the corresponding first signal line 20 may be achieved, simplifying the wiring. In some other embodiments of the present disclosure, the electrostatic protection unit 30 and the corresponding shift register 11 may also be arranged in gaps formed by different columns of circuit units 01. The present disclosure is not limited in this regard.

Figure 24:
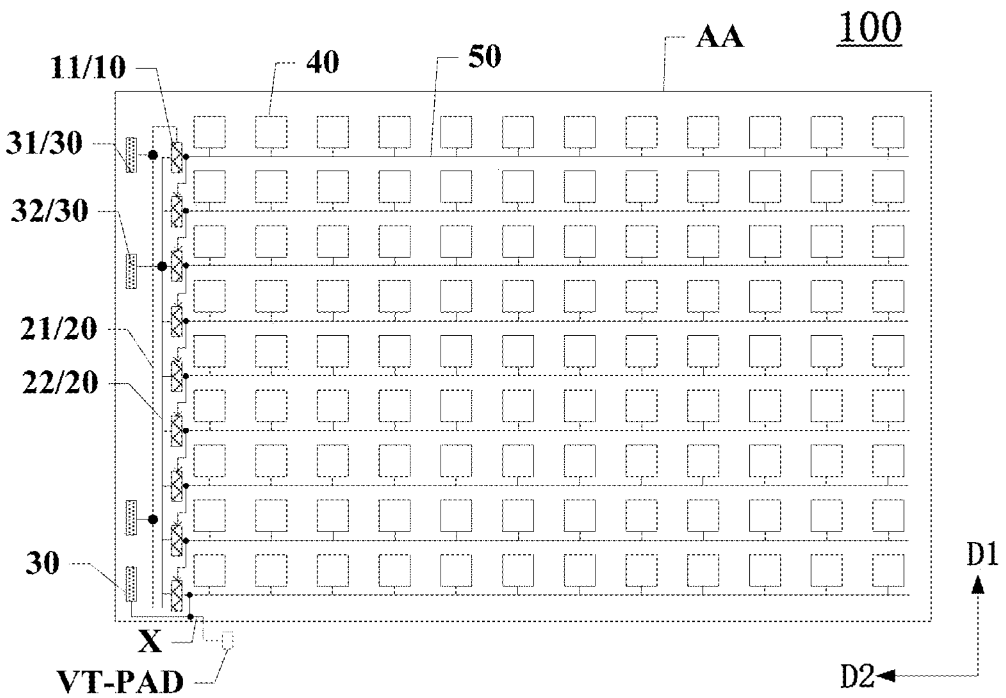
FIG. 24 illustrates yet another planar structural schematic diagram of a display panel in accordance with some embodiments of the present disclosure.

FIG. 24 illustrates another planar structural schematic diagram of a display panel according to some embodiments of the present disclosure. In some embodiments of the present disclosure, the display panel 100 includes a plurality of scan lines 50. The scan lines 50 are electrically connected to the shift register 11 and configured to receive scan signals transmitted by the shift register 11. The scan circuit 10 includes N-level shift registers 11, where $N \geq 3$. The scan line 50 connected to the Nth level shift register 11 is also electrically connected to the electrostatic protection unit 30, and the Nth level shift register 11 is further electrically connected to a detection signal line X.

During the manufacturing process of the display panel 100, testing is performed on the uncut display panel 100 prior to cutting. The Nth level (i.e., the final level) shift register 11 in the scan circuit 10 is connected to a detection pad VT-PAD via the detection signal line X to detect whether the display panel 100 is capable of scanning from the first row to the last row of pixels and performing illumination. After the testing is completed, the detection pad VT-PAD is cut off and not retained in the final product. However, after cutting, some segments of the detection signal line X remain in the final product and are located near the cutting edge. FIG. 24 schematically shows the cut detection pad VT-PAD and detection signal line using dashed lines, which are not included in the actual display panel. Therefore, this portion of the detection signal line X is more susceptible to electrostatic influence. In addition to the detection signal line X, the output terminal of the Nth level (final level) shift register is also connected to the scan line 50. When electrostatic discharge enters the display panel via the detection signal line X, it may affect both the final level shift register 11 and the signals on the scan line 50 connected to the final level shift register 11. Therefore, as disclosed, the scan line 50 connected to the Nth level shift register 11 is further electrically connected to the electrostatic protection unit 30, which is advantageous for reducing or avoiding the influence of electrostatic discharge transmitted via the detection signal line X on the scan line, thereby improving the electrostatic protection capability of the display panel. The connection position between the electrostatic protection unit 30 and the scan line 50 may be located on the scan line 50 or on the detection signal line X. The present disclosure is not limited in this regard, so long as the electrostatic charge may be conducted by the electrostatic protection unit 30 without being transmitted to the scan line.

Figure 25:
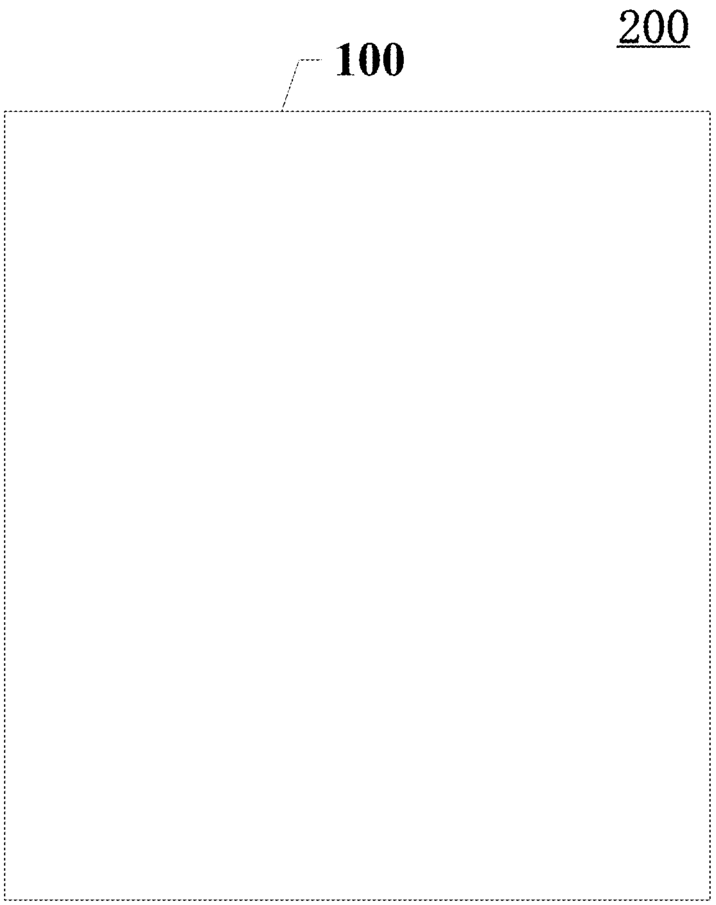
FIG. 25 illustrates a schematic structure diagram of a display device in accordance with some embodiments of the present disclosure.
Figure 26:
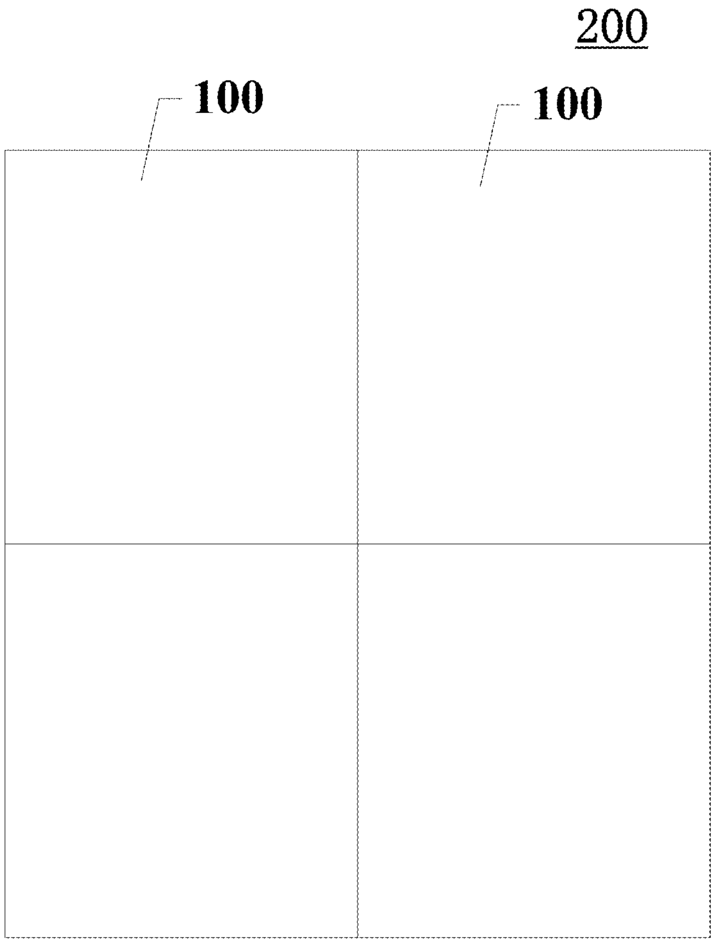
FIG. 26 illustrates another schematic structure diagram of a display device in accordance with some embodiments of the present disclosure.

Based on the same inventive concept, the present disclosure further provides a display device. FIG. 25 illustrates a structural schematic diagram of a display device according to some embodiments of the present disclosure, and FIG. 26 illustrates another structural schematic diagram of a display device according to some embodiments of the present disclosure. Referring to FIGS. 25 and 26, the display device 200 includes a display panel 100 according to any of the aforementioned embodiments. The embodiment illustrated in FIG. 26 takes a tiled display device composed of a plurality of display panels 100 as an example. Since the display panel provided in embodiments of the present disclosure is capable of achieving an ultra-narrow border or borderless display effect, a large-sized display device may be formed by tiling a plurality of display panels 100 as disclosed. This facilitates the minimization of visible seams and improves the overall display quality of large-sized tiled display devices.

The display device 200 provided in embodiments of the present disclosure may be any electronic device having a display function, such as a touch display screen, mobile phone, tablet computer, notebook computer, e-book, or television. The display device 200 provided in embodiments of the present disclosure benefits from the advantages of the display panel 100 disclosed herein. For specific details of the display panel 100, reference may be made to the above-described embodiments, which will not be repeated herein.

It is understood that FIG. 25 merely illustrates a rectangular configuration as an example of the shape of the display device 200. In other embodiments of the present disclosure, the display device 200 corresponding to FIG. 25 may also be circular, elliptical, or any other feasible shape, which is not limited by the present disclosure. In FIG. 26, the display device 200 is illustrated as including four display panels 100 merely as an example, and the present disclosure does not limit the actual number of display panels 100 included in the display device 200.

From the above-described embodiments, it is apparent that the display panel and display device provided by the present disclosure achieve at least the following beneficial effects:

The present disclosure provides a display panel and a display device. In display panel, the scan circuit is arranged in a display region. A first signal line arranged in the display region is configured to provide signals to the shift register. Meanwhile, an electrostatic protection unit is also arranged in the display region. As a result, the scan circuit and the electrostatic protection unit do not occupy space in the non-display region of the display panel. This allows the non-display region to be eliminated or reduced to a narrower width, thereby facilitating a borderless or ultra-narrow border design of the display panel, increasing the screen-to-body ratio, and improving the visual experience. Furthermore, the present disclosure introduces an electrostatic protection unit in the display region, and the electrostatic protection unit is electrically connected to a first signal line. When the display panel is subjected to electrostatic discharge, the electrostatic charge applied to the first signal line may be discharged through the electrostatic protection unit, thereby avoiding interference with the normal operation of the scan circuit and maintaining normal display performance of the display panel. This enhances the overall electrostatic discharge protection capability of the display product.

It should be noted that the relational terms such as "first" and "second" are used herein solely for the purpose of distinguishing one entity or operation from another and do not necessarily imply any actual relationship or order between such entities or operations. Moreover, the terms "include", "comprise", or any variations thereof are intended to cover non-exclusive inclusion, such that a process, method, article, or apparatus that includes a list of elements is not limited to those elements but may include other elements not expressly listed or inherent to such process, method, article, or apparatus. Without further limitation, an element defined by the phrase "including a . . . " does not exclude the presence of additional identical elements in the process, method, article, or apparatus that includes the element.

The foregoing description is merely a detailed explanation of specific embodiments of the present disclosure, enabling those skilled in the art to understand or implement the present disclosure. Various modifications to these embodiments will be apparent to those skilled in the art. The general principles defined herein may be applied to other embodiments without departing from the spirit or scope of the present disclosure. Therefore, the present disclosure is not limited to the embodiments described herein but should be accorded the broadest scope consistent with the principles and novel features disclosed herein.

What is claimed is:

1. A display panel, comprising a scan circuit, a first signal line, and an electrostatic protection unit, wherein the scan circuit comprises a plurality of shift registers, wherein the plurality of shift registers are arranged along a first direction and cascaded;

the first signal line is connected to the scan circuit and provides a signal to the scan circuit;

the scan circuit and the first signal line are both located in a display region; and the electrostatic protection unit is located in the display region and electrically connected to the first signal line.

2. The display panel according to claim 1, wherein the first signal line extends along the first direction.

3. The display panel according to claim 1, wherein at least a portion of the electrostatic protection unit is located on at least one side of the plurality of shift registers along a second direction, wherein the second direction intersects the first direction and is parallel to a plane of the display panel.

4. The display panel according to claim 1, wherein at least a portion of the electrostatic protection unit is located on at least one side of the plurality of shift registers along the first direction; and the plurality of shift registers comprise a first shift register and a second shift register, wherein along the first direction, the first shift register is located between the electrostatic protection unit and the second shift register and is adjacent to the electrostatic protection unit; and along the first direction, a width of the first shift register is smaller than a width of the second shift register.

5. The display panel according to claim 4, wherein the first shift register and the second shift register each comprise a plurality of transistors; and a width-to-length ratio of at least a portion of transistors in the first shift register is smaller than a width-to-length ratio of at least a portion of transistors in the second shift register.

6. The display panel according to claim 1, wherein at least a portion of the electrostatic protection unit is located on at least one side of the plurality of shift registers along a second direction;

at least a portion of the electrostatic protection unit is located on at least one side of the plurality of shift registers along the first direction, wherein the second direction intersects the first direction and is parallel to a plane of the display panel;

the electrostatic protection unit located on the at least one side of the plurality of shift registers along the first direction is a first electrostatic protection unit;

the electrostatic protection unit located on the at least one side of the plurality of shift registers along the second direction is a second electrostatic protection unit; and a width of the first electrostatic protection unit along the first direction is not equal to a width of the second electrostatic protection unit along the first direction, or a width of the second electrostatic protection unit along the second direction is not equal to a width of the first electrostatic protection unit along the second direction.

7. The display panel according to claim 1, wherein the plurality of shift registers comprise a first module and a second module arranged along a second direction, wherein the first module and the second module are electrically connected through at least a first wiring, at least a portion of the electrostatic protection unit is located between the first module and the second module, and the second direction intersects the first direction and is parallel to a plane of the display panel; or at least a portion of the electrostatic protection unit comprises a first unit and a second unit, wherein the first unit and the second unit are electrically connected and respectively located on opposite sides of the first signal line along a second direction, and the second direction intersects the first direction and is parallel to a light-emitting surface of the display panel.

8. The display panel according to claim 1, wherein the first signal line comprises a first sub-signal line and a second sub-signal line, and the electrostatic protection unit comprises a first electrostatic protection unit and a second electrostatic protection unit, wherein the first electrostatic protection unit is electrically connected to the first sub-signal line, and the second electrostatic protection unit is electrically connected to the second sub-signal line;

along a second direction, the first electrostatic protection unit and the second electrostatic protection unit are located on a same side of the first sub-signal line and the second sub-signal line; and along the second direction, a distance between the first electrostatic protection unit and the first sub-signal line is less than or equal to a distance between the second electrostatic protection unit and the first sub-signal line; or the first signal line comprises a first sub-signal line and a second sub-signal line, wherein along a second direction, the first sub-signal line is located on a first side of the plurality of shift registers, and the second sub-signal line is located on a second side of the plurality of shift registers, wherein the second direction intersects the first direction; and the electrostatic protection unit connected to the first sub-signal line is located on the first side of the plurality of shift registers, and the electrostatic protection unit connected to the second sub-signal line is located on the second side of the plurality of shift registers; or at least two electrostatic protection units are located on a same side of the first signal line along a second direction, the second direction intersecting the first direction, and the at least two electrostatic protection units located on the same side of the first signal line along the second direction are respectively connected to different first signal lines.

9. The display panel according to claim 1, wherein the first signal line comprises a first type signal line and a second type signal line, wherein the first type signal line receives a fixed potential signal, and the second type signal line receives a non-fixed potential signal; and a number of electrostatic protection units connected to at least one of the first type signal lines is n1, and a number of electrostatic protection units connected to at least one of the second type signal lines is n2, wherein n1<n2.

10. The display panel according to claim 9, wherein n1=0.

11. The display panel according to claim 1, further comprising: pixel driving circuits arranged in an array, and light-emitting elements connected to the pixel driving circuits, wherein the display region comprises a first region, and a second region located on at least one side of the first region along a second direction, wherein the second direction intersects the first direction and is parallel to a plane of the display panel;

the pixel driving circuits are located in the first region, and the light-emitting elements are located in both the first region and the second region; and the scan circuit and the electrostatic protection unit are located in the second region.

12. The display panel according to claim 11, wherein the first signal line comprises a first sub-signal line and a second sub-signal line, wherein in the second region, along the second direction, the first sub-signal line is located between the second sub-signal line and an edge of the display panel;

the first sub-signal line is capable of receiving a non-fixed potential signal; and a number of electrostatic protection units connected to the first sub-signal line is n01, and a number of electrostatic protection units connected to the second sub-signal line is n02, wherein n01>n02.

13. The display panel according to claim 12, wherein the second sub-signal line comprises a fixed potential signal line and a non-fixed potential signal line; and a number of electrostatic protection units connected to the fixed potential signal line is less than a number of electrostatic protection units connected to the non-fixed potential signal line.

14. The display panel according to claim 12, wherein the first sub-signal line is a startup trigger signal line, and the startup trigger signal line is configured to transmit a control signal to a first stage shift register; and the second sub-signal line is at least one of a first voltage signal line, a second voltage signal line, a first clock signal line, a second clock signal line, and a control signal line, wherein the first voltage signal line and the second voltage signal line are configured to transmit a power supply voltage signal to the plurality of shift registers, the first clock signal line and the second clock signal line are configured to transmit a clock signal to the plurality of shift registers, and the control signal line is configured to transmit a ramp signal to the plurality of shift registers.

15. The display panel according to claim 12, wherein the electrostatic protection units connected to the first sub-signal line are located on a side of the plurality of shift registers away from the first region, and the electrostatic protection units connected to at least one second sub-signal line are located on at least one side of the plurality of shift registers along the first direction; or along the second direction, the electrostatic protection units connected to the first sub-signal line and the electrostatic protection units connected to the second sub-signal line are both located on a side of the plurality of shift registers away from the first region, and along the first direction, the electrostatic protection units connected to the second sub-signal line are located between the electrostatic protection units connected to the first sub-signal line.

16. The display panel according to claim 12, wherein the scan circuit comprises N stages of shift registers, wherein N≥3;

the display panel comprises a first edge and a second edge, wherein the first edge and the second edge are oppositely arranged along the first direction, a first stage shift register is adjacent to the first edge, and an Nth stage shift register is adjacent to the second edge; and the electrostatic protection units connected to the first sub-signal line comprise: a first electrostatic protection unit, and a second electrostatic protection unit, wherein along the first direction, a distance between the first electrostatic protection unit and the first edge is less than a distance between a second stage shift register and the first edge, and a distance between the second electrostatic protection unit and the second edge is less than a distance between an (N−1)th stage shift register and the second edge.

17. The display panel according to claim 16, wherein, along the first direction or the second direction, the first electrostatic protection unit is adjacent to the first stage shift register or the second stage shift register, and the second electrostatic protection unit is adjacent to the Nth stage shift register or the (N−1)th stage shift register.

18. The display panel according to claim 1, further comprising: pixel driving circuits arranged in an array, and light-emitting elements connected to the pixel driving circuits, wherein the display region comprises: a first region, and a second region located on at least one side of the first region along a second direction, wherein the second direction intersects the first direction and is parallel to a plane of the display panel;

the pixel driving circuits are located in the first region, and the light-emitting elements are located in both the first region and the second region; and the scan circuit and the electrostatic protection unit are located in the first region.

19. The display panel according to claim 18, wherein the pixel driving circuits arranged in an array comprise: a plurality of pixel driving circuit rows arranged along the first direction, and a plurality of pixel driving circuit columns arranged along the second direction, a first spacing being provided between adjacent pixel driving circuit columns, wherein the plurality of shift registers and the electrostatic protection units are located between different pixel driving circuit rows, wherein along the first direction, the plurality of shift registers are at least partially non-overlapping with the first spacing, and/or the electrostatic protection unit is at least partially non-overlapping with the first spacing; or along the first direction, the plurality of shift registers overlap with the first spacing, and/or the electrostatic protection unit overlaps with the first spacing; or the display panel comprises a plurality of circuit units arranged in an array, wherein the plurality of circuit units comprise at least two of the pixel driving circuits arranged along the second direction;

along the second direction, a width of the electrostatic protection unit is less than a width of the plurality of circuit units, and at least a portion of the electrostatic protection unit is located between adjacent circuit units of the plurality of circuit units; and along the first direction, at least a portion of the electrostatic protection unit is located between adjacent shift registers of the plurality of shift registers.

20. A display device, comprising a display panel, wherein the display panel comprises: a scan circuit, a first signal line, and an electrostatic protection unit, wherein the scan circuit comprises a plurality of shift registers, wherein the plurality of shift registers are arranged along a first direction and cascaded;

the first signal line is connected to the scan circuit and provides a signal to the scan circuit;

the scan circuit and the first signal line are both located in a display region; and the electrostatic protection unit is located in the display region and electrically connected to the first signal line.

* * * * *